United States Patent
Kim et al.

(10) Patent No.: US 10,215,426 B2
(45) Date of Patent: Feb. 26, 2019

(54) OUTDOOR FAN MOTOR DRIVING DEVICE AND AIR CONDITIONER INCLUDING AN OUTDOOR FAN MOTOR DRIVING DEVICE

(71) Applicant: LG ELECTRONICS INC., Seoul (KR)

(72) Inventors: Eungho Kim, Seoul (KR); Jinsoo Kim, Seoul (KR); Gwigeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

(21) Appl. No.: 15/078,129

(22) Filed: Mar. 23, 2016

(65) Prior Publication Data
US 2016/0282005 A1    Sep. 29, 2016

(30) Foreign Application Priority Data
Mar. 23, 2015    (KR) .................. 10-2015-0040091

(51) Int. Cl.
*F04D 27/00* (2006.01)
*F24F 1/38* (2011.01)
(Continued)

(52) U.S. Cl.
CPC .............. *F24F 1/38* (2013.01); *F04D 25/068* (2013.01); *F04D 27/004* (2013.01);
(Continued)

(58) Field of Classification Search
CPC ..... H02P 1/04; H02P 6/22; F24F 11/65; F24F 11/77; F24F 11/30; F24F 11/0001;
(Continued)

(56) References Cited

U.S. PATENT DOCUMENTS 6,194,856 B1 *  2/2001  Kobayashi ............ H02M 7/003
                                                318/432
7,129,661 B2 * 10/2006  Sugiura ..................... H02P 6/10
                                                318/434
(Continued)

FOREIGN PATENT DOCUMENTS

CN      102536871 A   *  7/2012
EP      2 824 828         1/2015
(Continued)

OTHER PUBLICATIONS

A New Starting Method of BLDC Motors Without Position Sensor, by Lee et al., published 2006.*
(Continued)

*Primary Examiner* — Charles Freay
*Assistant Examiner* — Thomas Fink
(74) *Attorney, Agent, or Firm* — KED & Associates LLP.

(57) ABSTRACT

An outdoor fan motor driving device and an air conditioner including an outdoor fan motor driving device are provided, which may include an inverter to convert DC power into AC power according to a switching operation and to output the converted AC power to an outdoor fan motor, an output current detector to detect phase currents flowing in the outdoor fan motor, and a controller to control the inverter based on the detected phase currents. When the outdoor fan motor is rotated by external wind, in a state in which all of lower arm switching elements, among upper arm switching elements and lower arm switching elements of the inverter, are turned on before the outdoor fan motor is driven, with the result that levels of the phase currents flowing in the outdoor fan motor are between a first level and a second level, the controller may control the outdoor fan motor such that a rotational speed of the outdoor fan motor is increased while the outdoor fan motor is rotated in a first direction and then rotated in a second direction opposite to the first direction
(Continued)

during a speed increase period of the outdoor fan motor after an alignment period during which a rotor of the outdoor fan motor is aligned when the outdoor fan motor is driven.

20 Claims, 21 Drawing Sheets

(51) Int. Cl.
| | | |
|---|---|---|
| F04D 25/06 | (2006.01) | |
| F04D 29/32 | (2006.01) | |
| H02P 21/00 | (2016.01) | |
| H02M 7/5387 | (2007.01) | |
| F24F 11/30 | (2018.01) | |
| F24F 11/77 | (2018.01) | |
| F25B 13/00 | (2006.01) | |
| F25B 49/02 | (2006.01) | |

(52) U.S. Cl.
CPC ......... *F04D 29/321* (2013.01); *F04D 29/325* (2013.01); *F24F 11/30* (2018.01); *F24F 11/77* (2018.01); *H02M 7/5387* (2013.01); *H02P 21/00* (2013.01); *F25B 13/00* (2013.01); *F25B 49/022* (2013.01); *F25B 2313/0294* (2013.01); *F25B 2700/15* (2013.01)

(58) Field of Classification Search
CPC ........ F24F 11/49; F04D 27/004; F04D 15/02; F04D 15/0066; F04D 15/0254; F04D 15/0245; F04D 15/0209; F25B 2313/0294
USPC ..... 417/425, 325–326, 42, 44.11, 280, 423.7
See application file for complete search history.

(56) References Cited

U.S. PATENT DOCUMENTS

| | | | | |
|---|---|---|---|---|
| 2007/0041824 | A1* | 2/2007 | Hsieh | .................... F04D 27/004 415/47 |
| 2010/0060213 | A1* | 3/2010 | Hasegawa | ................. H02P 6/14 318/400.04 |
| 2010/0114379 | A1* | 5/2010 | Sato | .......................... F24F 1/38 700/275 |
| 2010/0226792 | A1* | 9/2010 | Sato | ....................... F04D 25/166 417/1 |
| 2016/0131142 | A1* | 5/2016 | Nakajima | ............. F04D 27/004 417/42 |
| 2016/0329844 | A1* | 11/2016 | Sato | .......................... H02P 1/58 |
| 2016/0359438 | A1* | 12/2016 | Taoka | ..................... H02P 1/029 |

FOREIGN PATENT DOCUMENTS

| | | | | | |
|---|---|---|---|---|---|
| JP | | 07337080 | A * | 12/1995 | ........... F04D 27/004 |
| JP | | 11187690 | A * | 7/1999 | |
| JP | | 2005124330 | A * | 5/2005 | ........... F04D 27/004 |
| JP | | 2006254626 | A * | 9/2006 | |
| JP | | 2008136271 | A * | 6/2008 | |
| JP | | 2011-109735 | | 6/2011 | |
| JP | | 2013198234 | A * | 9/2013 | |
| WO | WO 2009/096649 | | | 8/2009 | |

OTHER PUBLICATIONS

Borisavljevic et al.: "Fan Drive Starting into Naturally Rotating Load by Sinusoidal Sensorless Permanent Magnet Motor Control"; Power Electronics and Motion Control Conference, 2006. EPE-PEMC 2006. 12th International, IEEE, Piscataway, NJ, USA, Aug. 30, 2006, pp. 1190-1198, XP031421782.
European Search Report dated Oct. 14, 2016 issued in Application No. 16161632.1.

* cited by examiner

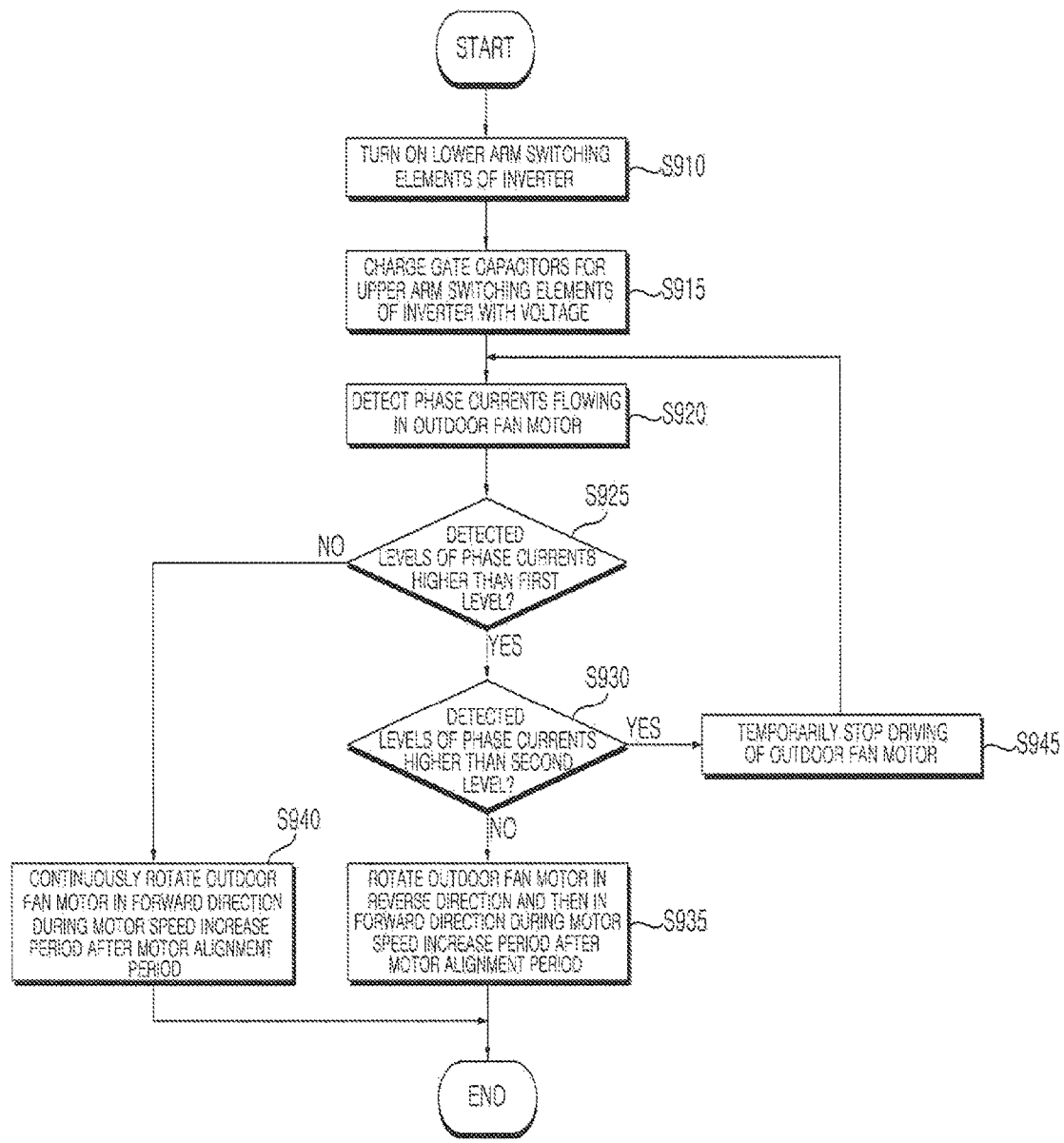

FIG. 11B
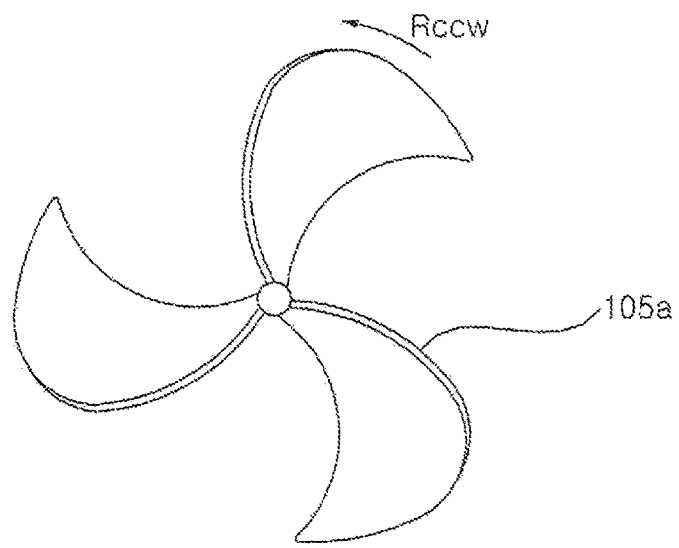
(a)
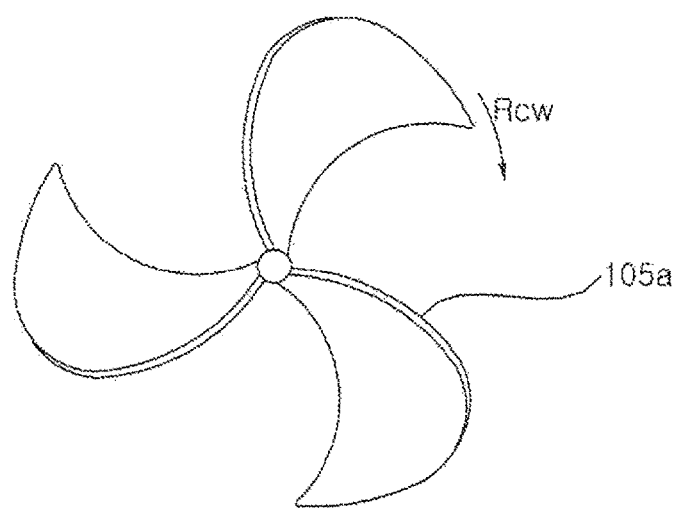
(b)

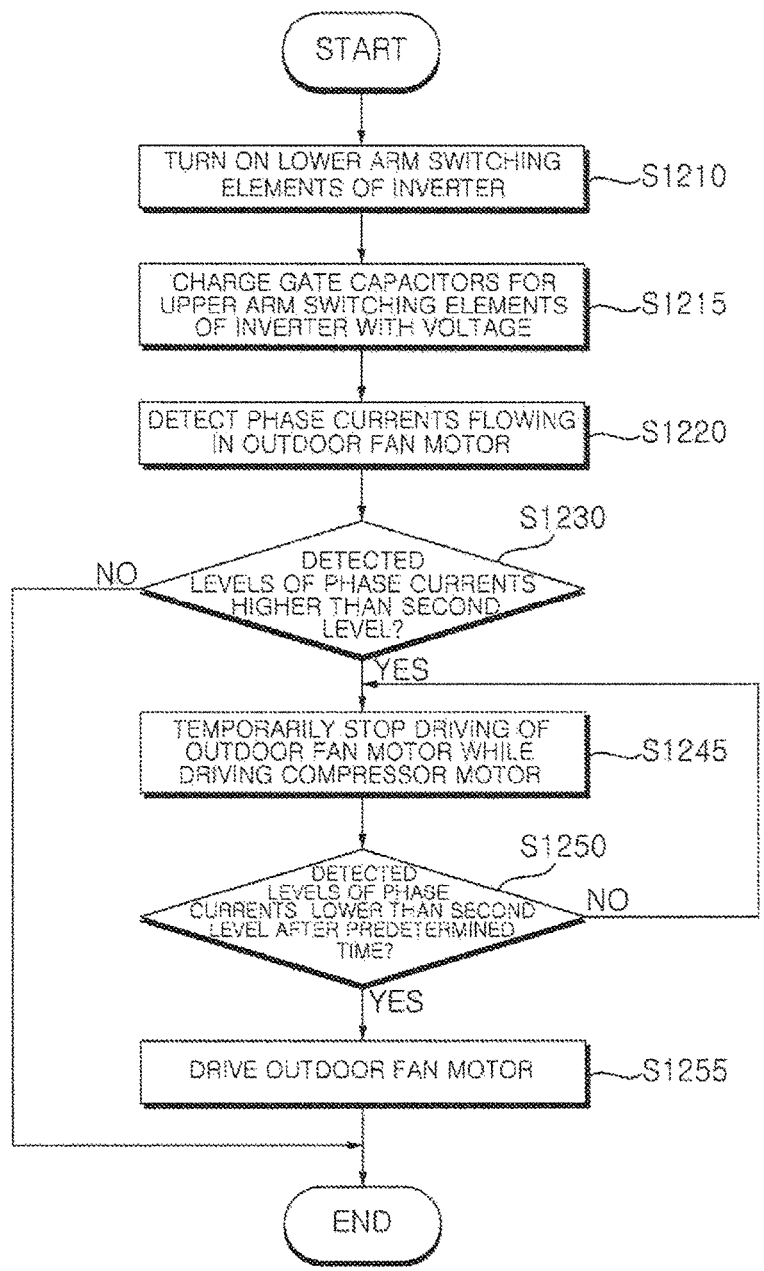

OUTDOOR FAN MOTOR DRIVING DEVICE AND AIR CONDITIONER INCLUDING AN OUTDOOR FAN MOTOR DRIVING DEVICE

CROSS-REFERENCE TO RELATED APPLICATIONS

This application claims the priority benefit of Korean Patent Application No. 10-2015-0040091, filed on Mar. 23, 2015 in the Korean Intellectual Property Office, the disclosure of which is incorporated herein by reference.

BACKGROUND

1. Field

An outdoor fan motor drive and an air conditioner including an outdoor fan motor driving device are disclosed herein.

2. Background

An air conditioner is installed for discharging cool air or hot air into a room to adjust an indoor temperature and to purify indoor air, thereby providing a comfortable indoor environment for users. In general, the air conditioner includes an indoor unit or device installed in the room and an outdoor unit or device to supply a refrigerant to the indoor unit. The indoor unit includes an indoor heat exchanger. The outdoor unit includes a compressor and an outdoor heat exchanger.

BRIEF DESCRIPTION OF THE DRAWINGS

Embodiments will be described in detail with reference to the following drawings in which like reference numerals refer to like elements, and wherein:

FIG. 9 is a flowchart showing a method of driving an outdoor fan motor according to an embodiment;

FIG. 12 is a flowchart showing a method of driving an outdoor fan motor according to another embodiment.

DETAILED DESCRIPTION

Reference will now be made in detail to embodiments, examples of which are illustrated in the accompanying drawings. Where possible, the same or like reference numbers have, been used to indicate the same or like elements, and repetitive disclosure has been omitted.

The terms "module" "unit, when attached to the names of components are used herein to help the understanding of the components and thus they should not be considered as having specific meanings or roles. Accordingly, the terms module" and "unit" may be used interchangeably.

Figure 1:
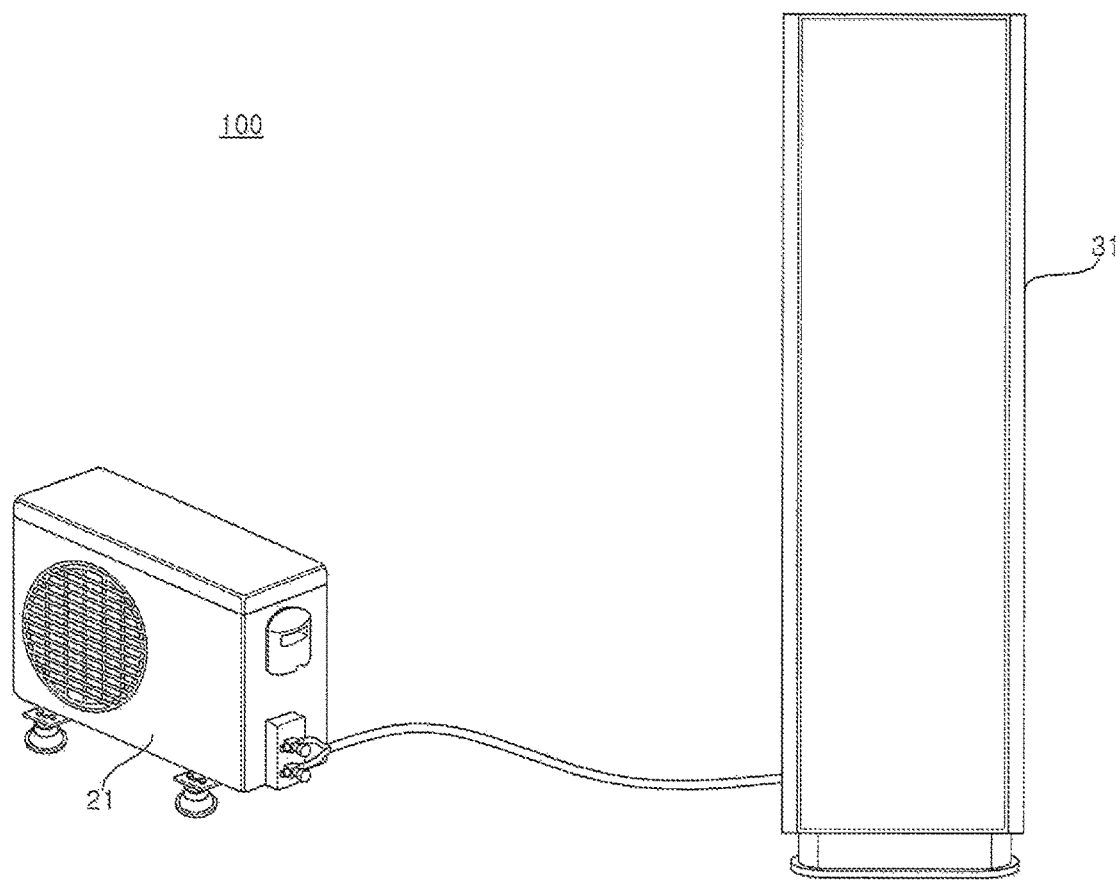
FIG. 1 is a view exemplarily showing an air conditioner according to an embodiment.

FIG. 1 is a view exemplarily showing an air conditioner according to an embodiment. As shown in FIG. 1, an air conditioner 100 according to an embodiment may include an indoor unit or device 31 and an outdoor unit or device 21 connected to the indoor unit 31.

A stand type indoor unit, a wall mount type indoor unit, or a ceiling type indoor unit may be used as the indoor unit 31 of the air conditioner 100. In this embodiment, the stand type indoor unit is used as the indoor unit 31 of the air conditioner 100.

The air conditioner 100 may include at least one selected from among a ventilator, a air purifier, a humidifier, or a heater, which may be operatively connected to the indoor unit 31 and the outdoor unit 21. The outdoor unit 21 may include a compressor (not shown) that compresses a refrigerant, an outdoor heat exchanger (not shown) that performs heat exchange between the refrigerant and outdoor air, an accumulator (not shown) that extracts a gas refrigerant component from the refrigerant and supplies the extracted gas refrigerant component to the compressor, and a four-way valve (not shown) that changes a flow channel of the refrigerant based on a heating operation. In addition the outdoor unit 21 may further include a plurality of sensors, a valve, and an oil collector descriptions of which have been omitted as they are known in the art.

The compressor and the outdoor heat exchanger of the outdoor unit 21 may be operated to compress the refrigerant or perform heat exchange with the refrigerant based on set or predetermined conditions and to supply the compressed refrigerant or the heat-exchanged refrigerant to the indoor unit 31. The outdoor unit 21 may be driven according to demand of the Indoor unit 31 or a remote controller (not shown). A cooling/heating capacity of the air conditioner may be changed based on indoor units which are driven. Consequently, it is possible to change a number of outdoor units which are driven and a number of compressors which are driven.

The outdoor unit 21 may supply the compressed refrigerant to the indoor unit 31. The indoor unit 31 may receive the refrigerant from the outdoor unit 21 and discharge cool air or hot air into a room in which the indoor unit 31 is installed. The indoor unit 31 may include an indoor heat exchanger (not shown), an indoor fan (not shown) an expansion valve (not shown) that expands the refrigerant, and a plurality of sensors (not shown).

The outdoor unit 21 and the indoor unit 31 may be connected to each other via a communication cable, such that the outdoor unit 21 and the indoor unit 31 may transmit and receive data to and from each other. In addition, the outdoor unit 21 and the indoor unit 31 may be connected to the remote controller (not shown) in a wired or wireless fashion, such that the outdoor unit 21 and the indoor unit 31 may be operated according to control of the remote controller (not shown).

The remote controller (not shown) may be connected to the indoor unit 31 to allow a user to input a control command for controlling the indoor unit 31 and for receiving and displaying state information of the indoor unit 31. The remote controller may communicate with the indoor unit 31 in a wired or wireless fashion based on a type of connection between the remote controller and the indoor unit 31.

Figure 2:
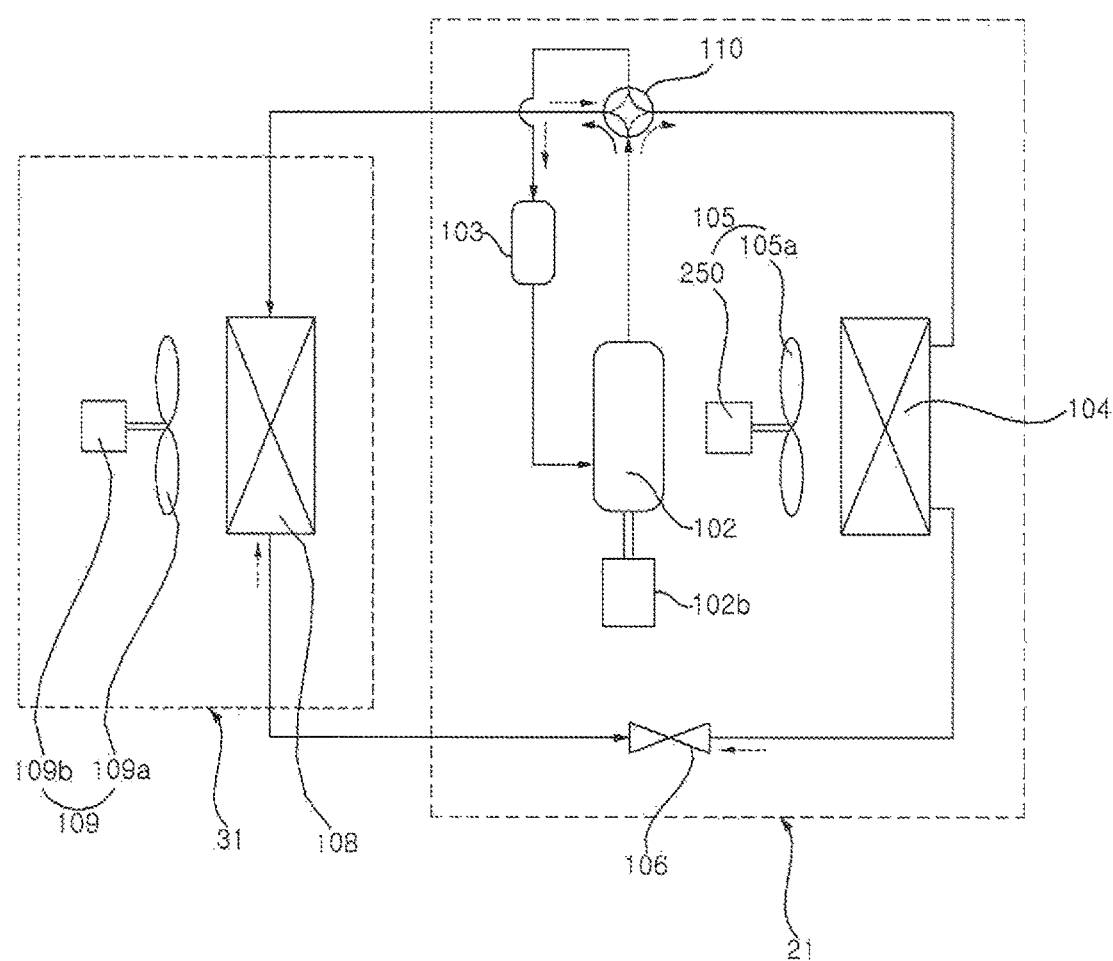
FIG. 2 is a schematic view of an outdoor unit and an indoor unit shown in FIG. 1.

FIG. 2 is a schematic view of the outdoor unit and the indoor unit shown in FIG. 1. Referring to FIG. 2, the air conditioner 100 is generally divided into the indoor unit 31 and the outdoor unit 21.

The outdoor unit 21 may include a compressor 102 that compresses a refrigerant a compressor motor 102b that drives the compressor 102, an outdoor heat exchanger 104 that dissipates the compressed refrigerant an outdoor blower 105 including an outdoor fan 105a disposed or provided at one side of the outdoor heat exchanger 104 that accelerates dissipation of the refrigerant and an outdoor fan motor 250 that rotates the outdoor fan 105a, an expansion device or an expansion valve 106 that expands the condensed refrigerant, a cooling/heating switching valve or a four-way valve 110 that changes a flow channel of the compressed refrigerant, and an accumulator 103 that temporarily stores the gaseous refrigerant to remove moisture and foreign matter from the refrigerant and that supplies the refrigerant to the compressor 102 under a predetermined pressure.

The indoor unit 31 may include an indoor heat exchanger 108 disposed or provided in a room that performs a cooling/heating function, and an indoor blower 109 including an indoor fan 109a disposed or provided at one side of the indoor heat exchanger 108 that accelerates dissipation of the refrigerant and an indoor fan motor 109b that rotates the indoor fan 109a. At least one indoor heat exchanger 108 may be provided. At least one selected between an inverter compressor and a constant speed compressor may be used as the compressor 102.

In addition, the air conditioner 100 may be configured as a cooler that cools the room or as a heat pump that cools or heats the room. The outdoor fan 105a of the outdoor unit 21 may be driven by an outdoor fan motor driving unit or drive 200 (see FIG. 3) that drives the outdoor fan motor 250. Hereinafter, the outdoor fan motor driving unit 200 may be referred to as an "outdoor fan motor driving device or drive".

The compressor 102 of the outdoor unit 21 may be driven by a compressor driving unit or drive 113 (see FIG. 3) that drives the compressor motor 102b. In addition, the indoor fan 109a of the indoor unit 31 may be driven by an indoor fan motor driving unit 300 or drive (see FIG. 3) that drives the indoor fan motor 109b.

Figure 3:
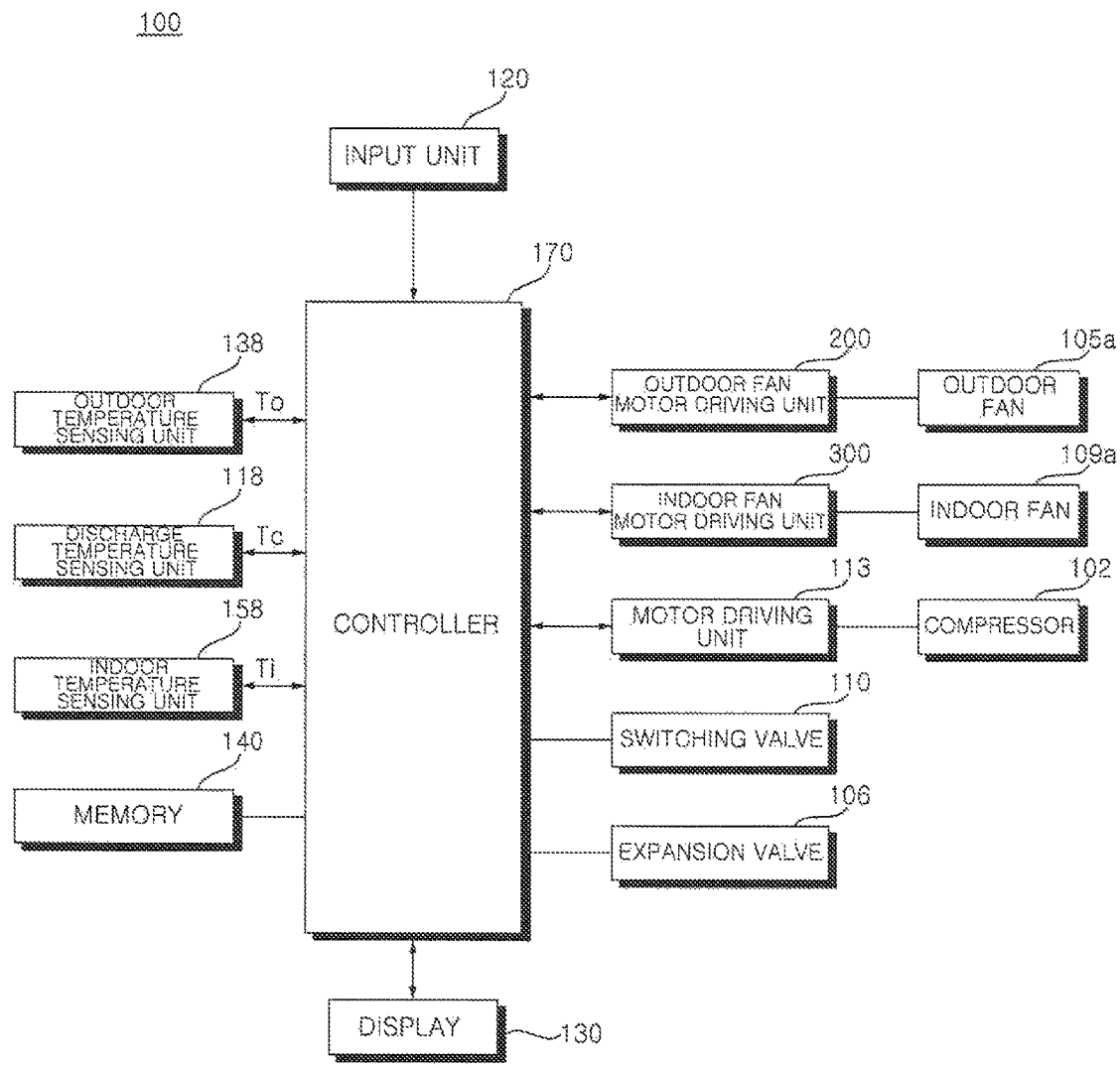
FIG. 3 is a schematic internal block diagram of the air conditioner of FIG. 1.

FIG. 3 is a schematic internal block diagram of the air conditioner of FIG. 1. Referring to AG. 3, the air conditioner 100 may include; the compressor 102, the outdoor fan 105a, the indoor fan 109a, a controller 170, a discharge temperature sensing unit or sensor 118, an outdoor temperature sensing unit or sensor 138, an indoor temperature sensing unit or sensor 158, and a memory 140. The air conditioner 100 may further include the compressor driving unit 113, the outdoor fan motor driving unit 200, the indoor fan motor driving unit 300, the switching valve 110, the expansion valve 106, a display 130, and an input unit or input 120.

The compressor 102, the outdoor fan 105a, and the indoor fan 109a were previously described with reference to FIG. 2. The input unit 120 may include a plurality of manipulation buttons. The input unit 120 may transmit a signal for an operation target temperature of the air conditioner 100 input therethrough to the controller 170.

The display 130 may display an operation state of the air conditioner 100 in particular, in connection with embodiments disclosed herein, the display 130 may display information regarding an intensity of external wind, and information regarding an operation state of the air conditioner 100 based on the external wind, which hereinafter be described with reference to FIGS. 13A to 13D.

The memory 140 may store data necessary to operate the air conditioner 100. In particular, in connection with embodiments disclosed herein, the memory 140 may store data regarding a first level and a second level selected from among phase current levels for determining the intensity of external wind.

The discharge temperature sensing unit 118 may sense a refrigerant discharge temperature To at the compressor 102. The discharge temperature sensing unit 118 may transmit a signal for the sensed refrigerant discharge temperature Tc to the controller 170.

The outdoor temperature sensing unit 138 may sense a temperature around the outdoor unit 21 of the air conditioner 100, that is, an outdoor temperature To. The outdoor temperature sensing unit 138 may transmit a signal for the sensed outdoor temperature To to the controller 170.

The indoor temperature sensing unit 158 may sense a temperature around the indoor unit 31 of the air conditioner 100, that is, an indoor temperature Ti. The outdoor temperature sensing unit 138 may transmit a signal for the sensed indoor temperature Ti to the controller 170.

The controller 170 may control the air conditioner 100 to be operated based on at least one selected from the sensed refrigerant discharge temperature To, the sensed outdoor temperature To, the sensed indoor temperature Ti, or the input target temperature. For example, the controller 170 may calculate a final target superheat degree and control the air conditioner 100 to be operated based, on the calculated final target superheat degree.

The controller 170 may control the compressor driving unit 113, the outdoor fan motor driving unit 200, and the indoor fan motor driving unit 300 to drive the compressor 102, the outdoor fan 105a, and the indoor fan 109a, respectively. For example, the controller 170 may output speed reference value signals corresponding to the target temperature to the compressor driving unit 113, the outdoor fan motor driving unit 200, and the indoor fan motor driving unit 300.

The compressor motor 102b, the outdoor fan motor 250, and the indoor fan motor 109b may be operated at target rotational speeds based on the speed reference value signals. In addition, the controller 170 may control an overall operation of the air conditioner 100, in addition to control of the compressor driving unit 113, the outdoor fan motor driving unit 200, or the indoor fan motor driving unit 300.

For example, the controller 170 may control an operation of the cooling/heating switching valve or the four-way valve 110. In addition, the controller 170 may control an operation of the expansion device or the expansion valve 106.

Figure 4:
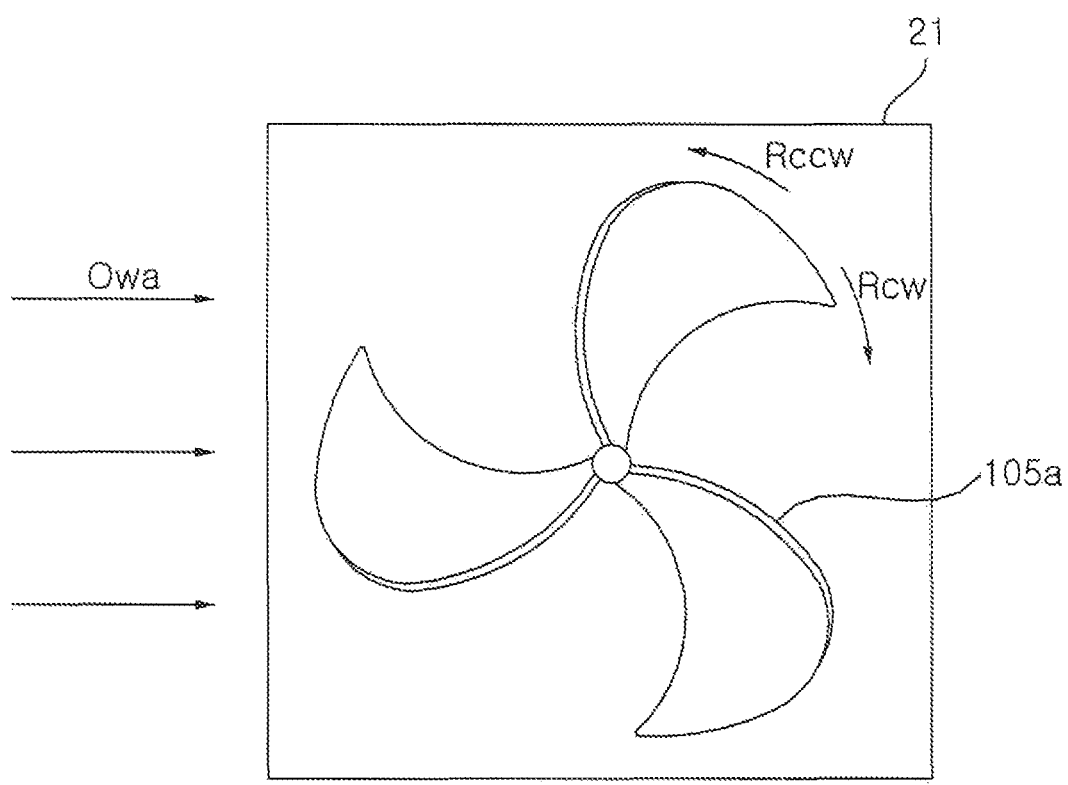
FIG. 4 is a view schematically showing an outdoor fan of the outdoor unit shown in FIG. 1, which is rotated by external wind.

FIG. 4 is a view schematically showing the outdoor fan of the outdoor unit shown it FIG. 1, which is rotated by external wind. Referring to FIG. 4, the outdoor unit 21 may include the outdoor fan 105a. As previously described, the outdoor heat exchanger 104 may perform heat exchange according to rotation of the outdoor fan 105a.

In general, the outdoor fan 105a may be rotated in a forward direction, that is, a clockwise direction Rcw, according to driving, of the outdoor fan motor 250. According to rotation of the outdoor fan 105a, the outdoor heat exchanger 104 may perform heat exchange in the clockwise direction Rcw. In the clockwise direction Rcw, heat exchange may be performed more efficiently than in a counterclockwise direction Rccw, which is a direction opposite to the clockwise direction Rcw.

The outdoor fan 105a may be unintentionally rotated by external wind Owa as the outdoor unit 21 is installed outdoors. In particular, in a state in which the operation of the air conditioner 100 is stopped, and therefore, the operation of the outdoor fan motor 250 of the outdoor unit 21 is stopped, the outdoor fan 105a may be rotated in the counterclockwise direction Rccw by the external wind Owa.

In a case in which the outdoor fan 105a, which is being rotated in the counterclockwise direction Rccw, is driven in a state in which the intensity of the external wind Owa is high such that the outdoor fan 105a may be rotated in the clockwise direction Rcw, an internal motor driving algorithm may not be properly executed due to a stall phenomenon. Therefore, embodiments disclosed herein provide a method of selectively driving the outdoor fan motor 250 based on the intensity of external wind. According to this method, it is possible to stably drive the outdoor fan motor 250 irrespective of the external wind, which will hereinafter be described with reference to FIG. 7.

Figure 5:
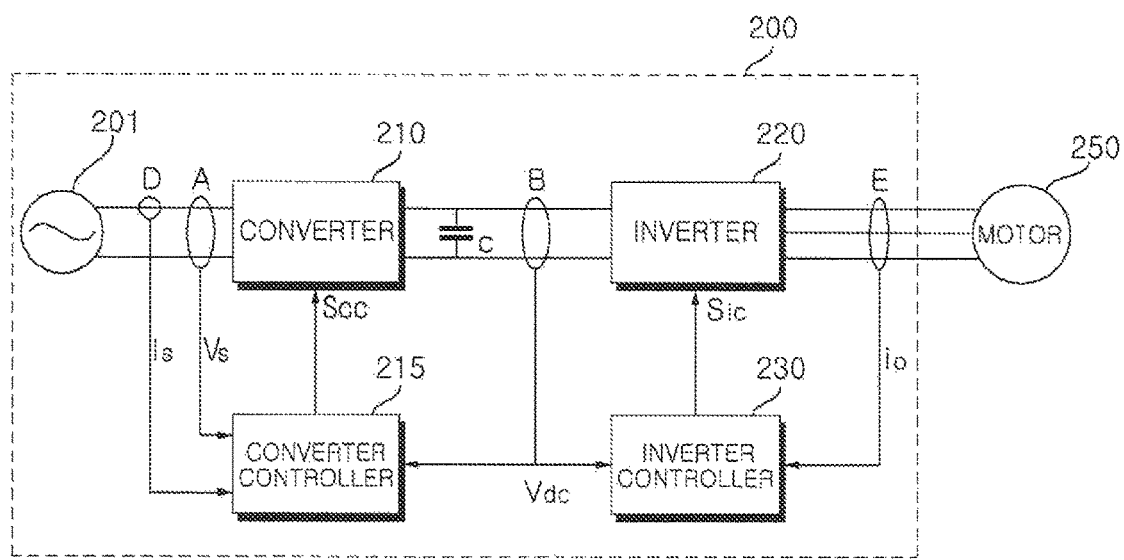
FIG. 5 is a circuit diagram showing an example of an outdoor fan motor driving device of the outdoor unit shown in FIG. 1.

FIG. 5 is a circuit diagram show an example of the outdoor fan motor driving device of the outdoor unit shown in FIG. 1. Referring to FIG. 5, the outdoor fan motor driving device 200 may include an inverter 220 that outputs three phase AC currents to the outdoor fan motor 250, an inverter controller 230 that controls the inverter 220, a converter 210 that supplies DC power to the inverter 220, a converter controller 215 that controls the converter 210, and a DC terminal capacitor C. In addition, the outdoor fan motor driving device 200 may further include a DC terminal voltage detection unit or detector B, an input voltage detection unit or detector A, an input current detection unit or detector D, and an output current detection unit or detector E.

The outdoor fan motor driving device 200 may convert AC power received from a system and supply the converted power to the outdoor fan motor 250. For this reason, the outdoor fan motor driving device 200 may be referred to as a "power conversion device".

The converter 210 may convert input AC power into DC power. The converter 210 may include only a rectification unit or rectifier (not shown). Alternatively, the converter 210 may include both a rectification unit or rectifier and a switching element or switch.

The rectification unit (not shown) may rectify input single-phase AC power 201 and output the rectified power. The rectification unit (not shown) may include two pairs of upper and lower arm diodes, which may be connected in parallel to each other. In this case, each pair of upper and lower arm diodes may include an upper arm diode element or diode D'a and a lower arm diode element or diode D'b, which may be connected in series to each other. That is, the upper and lower arm diodes may be connected to each other in the form of a bridge.

In a case in which the converter 210 includes the switching element, the converter 210 may be a boost converter. That is, the converter 210 may include an inductor and a diode disposed or provided between the rectification unit (not shown) and the inverter 220, in a state in which the inductor and the diode are connected in series to each other, and, a switching element connected between the inductor and the diode.

In a case in which the converter 210 includes the switching element, the converter controller may control a turn on timing of the switching element. Consequently, the converter controller 215 may output a converter switching control signal Scc for turn on timing of the switching element.

The converter controller 215 may receive an input voltage Vs and an input current Is from the input voltage detection unit A and the input current detection unit D, respectively. The input voltage detection unit A may detect the input voltage Vs from the input AC power 201. For example, the input voltage detection unit A may be disposed or provided at a front of the rectification unit (not shown).

The input voltage detection unit A may include a resistor element and an operational amplifier (OP AMP) for voltage detection. The detected input voltage Vs may be applied to the converter controller 215 in the form of a pulse type discrete signal to generate a converter switching control signal Scc.

The input voltage detection unit A may detect a zero crossing point of the input voltage. The input current detection unit D may detect the input current is from the input AC power 201. More specifically, the input current detection unit D may be disposed or provided at the front of the rectification unit (not shown).

The input current detection unit D may include a current sensor, a current transformer (CT), and a shunt resistor for current detection. The detected input current Is may be applied to the converter controller 215 in the form of a pulse type discrete signal to generate a converter switching control signal Scc.

The DC terminal voltage detection unit B may detect a DC voltage Vdc of the DC terminal capacitor C. A resistor element or an OP AMP, for example, may be used to detect power. The detected voltage Vdc of the DC terminal capacitor C may be applied to the inverter controller 230 in the form of a pulse type discrete signal. An inverter switching control signal Sic may be generated based on the DC voltage Vdc of the DC terminal capacitor C.

In addition, the detected DC voltage Vdc may be applied to the converter controller 215 to generate a converter switching control signal Scc. The inverter 220 may include a plurality of inverter switching elements. The inverter 220 may convert DC power Vdc smoothed by on/off operations of the switching elements into three phase AC power having a predetermined frequency and output the three phase AC power to the three phase motor 250.

Consequently, the inverter 220 may supply inverter power to the outdoor fan motor 250, which is load. At this time, the inverter power is power necessary for the outdoor fan motor 250, which is load. The inverter power may follow necessary target power.

More specifically, the inverter 220 may include a plurality of switching, elements or switches. For example, upper arm switching elements or switches Sa, Sb, and Sc and lower arm switching elements or switches S'a, S'b, and S'c may be connected in series to each other to form three pairs of upper and lower arm switching elements Sa & S'a, Sb & S'b, and Sc & S'c, which may be connected in parallel to each other. In addition, diodes may be connected in reverse parallel to the respective switching elements Sa, S'a, Sb, S'b, Sc, and S'c.

The inverter controller 230 may output the inverter switching control signal Sic to the inverter 220 so as to control a switching operation of the inverter 220. The inverter switching control signal Sic, which may be a pulse width modulation (PWM) type switching control signal, may be generated and output based on an output current io, which may be three phase currents flowing in the outdoor fan motor 250 and the DC terminal voltage Vdc applied between opposite terminals of the DC terminal capacitor. At this tire, the three phase output currents io may be detected by the output current detection unit E, and the DC terminal voltage Vdc may be detected by the DC terminal voltage detection unit B.

The output current detection unit E may detect the output current io flowing between the inverter 220 and the outdoor fan motor 250. That is, the output current detection unit E may detect the current flowing in the outdoor fan motor 250. The output current detection unit E may detect all three phase output currents ia, ib, and ic. Alternatively, the output current detection unit E may detect two phase output currents using ternary phase equilibrium.

The output current detection unit E may be disposed or provided between the inverter 220 and the outdoor fan motor 250. A current transformer (CT), or a shunt resistor, for example, may be used for current detection.

The output inverter switching control signal Sic may be converted into a gate driving signal by a gate driver (not shown) and then input to gates of the respective switching elements of the inverter 220. As a result, the switching elements Sa, S'a, Sb, S'b, Sc, and S'c of the inverter 220 may perform switching operations.

In connection with embodiments disclosed herein, in a case in which the outdoor fan motor 250 is rotated by external wind, in a state, in which all of the lower arm switching elements S'a, S'b, and S'c, among the upper arm switching elements Sa, Sb, and Sc and the lower arm switching elements S'a, S'b, and S'c of the inverter 220, are turned on before the outdoor fan motor 250 is driven, with the result that levels of the phase currents ia, ib, and ic flowing in the outdoor fan motor 250 are between a first level and a second level, the inverter controller 230 may control the outdoor fan motor 250 such that a speed of the outdoor fan motor 250 is increased while the outdoor fan motor 250 is rotated in a first direction and then rotated in a second direction opposite to the first direction during a speed increase period, of the outdoor fan motor 250 after an alignment period during which a rotor of the outdoor fan motor 250 is aligned when the outdoor fan motor 250 is driven. As a result, it is possible to stably drive the outdoor fan motor 250 even when the outdoor fan is rotated by the external wind.

In a case in which the levels of the phase currents ia, ib, and ic flowing in the outdoor fan motor 250 are lower than the first level in a state in which all of the lower arm switching elements S'a, S'b, and S'c, among the upper arm switching elements Sa, Sb, and Sc and the lower arm switching elements S'a, S'b, and Sc' of the inverter 220, are turned on before the outdoor fan motor 250 is driven, the inverter controller 230 may control the outdoor fan motor 250 such that the speed of the outdoor fan motor 250 is increased while the outdoor fan motor 250 is rotated in the second direction during the speed increase period of the outdoor fan motor 250 after the alignment period during which the rotor of the outdoor fan motor 250 is aligned when the outdoor fan motor 250 is driven.

In a case in which the outdoor fan motor 250 is rotated by the external wind, in a state in which all of the lower arm switching elements S'a, S'b, and S'c, among the upper arm switching elements Sa, Sb, and Sc and the lower arm switching elements S'a, S'b, and S'c of the inverter 220, are turned on before the outdoor fan motor 250 is driven, with the result that the levels of the phase currents ia, ib, and ic flowing in the outdoor fan motor 250 are higher than the second level the inverter controller 230 may control the outdoor fan motor 250 such that driving of the outdoor fan motor 250 is temporarily stopped and then the driving of the outdoor fan motor 250 is resumed after a predetermined period of time.

When gate capacitors are charged with gate driving voltage before the outdoor fan motor 250 is driven, the inverter controller 230 may determine the intensity of external wind based on the detected phase currents ia, ib, and ic of the outdoor fan motor 250. Consequently, it is possible to easily and conveniently determine the intensity of external wind without assignment of an additional determination time.

In a case in which the levels of the phase currents ia, ib, and ic flowing in the outdoor fan motor 250 are higher than the second level, the inverter controller 230 or the controller 170 may control the outdoor fan, motor 250 such that the driving of the outdoor fan motor 250 is temporarily stopped while the compressor motor 102b is continuously operated to drive the compressor. Consequently, if is possible to continuously drive the compressor. In addition, the inverter controller 230 or the controller 170 may control an operation mode of the air conditioner based on the external wind to be displayed through an additional display, thereby improving user convenience.

Operation of the inverter controller 230 according to embodiments disclosed herein will be described with reference to FIG. 7 and subsequent figures.

Figure 6A:
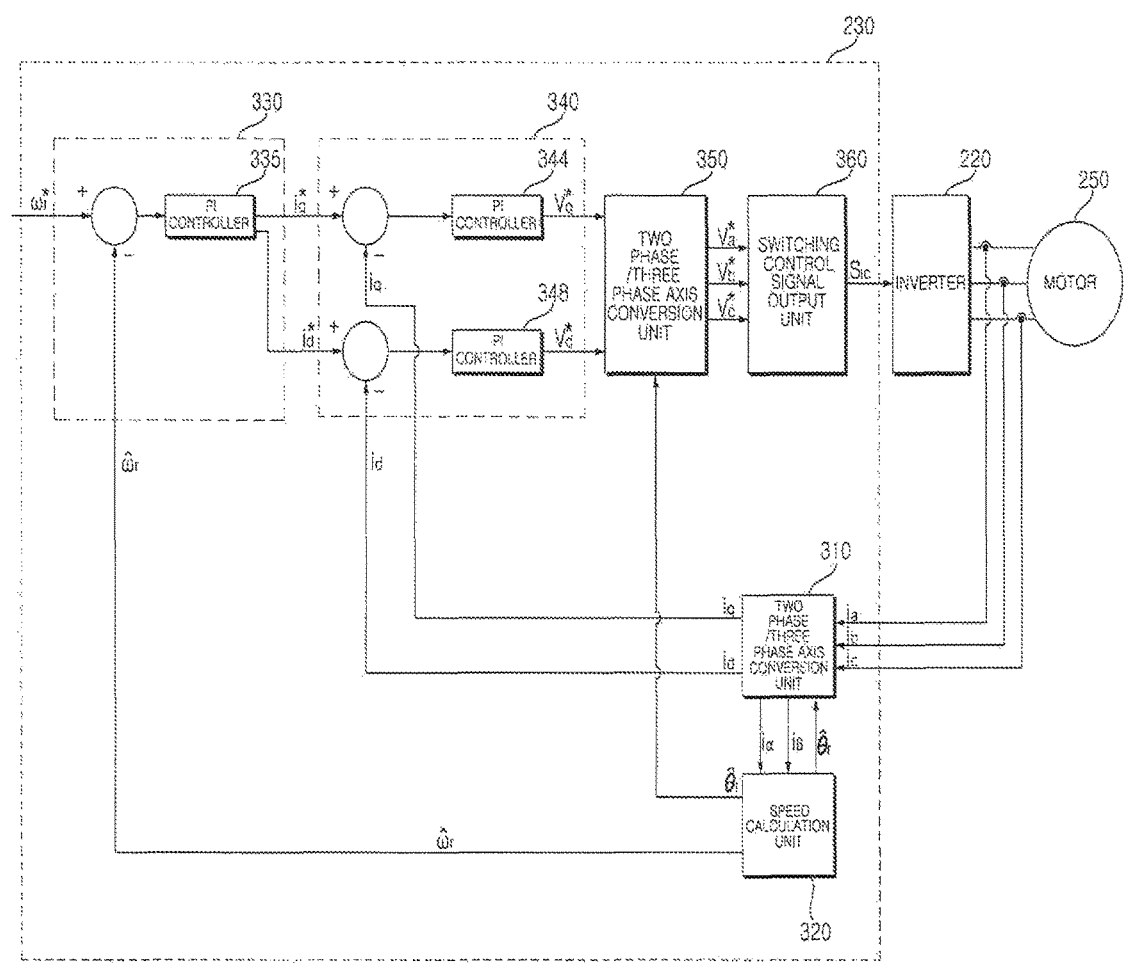
FIG. 6A is an internal block diagram of an inverter controller shown in FIG.

FIG. 6A is an internal block diagram of the inverter controller shown in FIG. 5. Referring to FIG. 6A, the inverter controller 230 may include an axis conversion unit or converter 310, a speed calculation unit or calculator 320, a current reference generation unit or generator 330, a voltage reference generation unit or generator 340, an axis conversion unit or converter 350, and a switching control signal output unit or output 360.

The axis conversion unit 310 may convert the three phase output currents ia, ib, and is received from the output current detection unit E into two phase currents iα and iβ of a stationary coordinate system. Also the axis conversion unit 310 may convert the two phase currents iα and iβ of the stationary coordinate system into two phase currents id and iq of a rotating coordinate system. The speed calculation unit 320 may output a position $\hat{\theta}_r$ and speed $\hat{\omega}_r$ calculated based on the two phase currents iα and iβ of the stationary coordinate system converted by the axis conversion unit 310.

The current reference generation unit 330 may generate a current reference value $i^*_q$ based on the calculated speed $\hat{\omega}_r$ and a speed reference value $\omega^*_r$. For example, the current reference generation unit 330 may generate a current reference value $i^*_q$ based on a difference between the calculated speed $\hat{\omega}_r$ and the speed reference value $\omega^*_r$ while performing PI control through a PI controller 335. In FIG. 6A, a q-axis current reference value $i^*_q$ is used as the current reference value. Alternatively, a d-axis current reference value $i^*_d$ may also be generated. The d-axis current reference value $i^*_d$ may be set to 0.

The current reference generation unit 330 may further include a miter (not shown) that limits a level of the current reference value $i^*_d$ such that the current reference value $i^*_d$ does not deviate from an allowable range. The voltage reference generation unit 340 may generate d-axis and q-axis voltage reference values $v^*_d$ and $v^*_q$ based on the d-axis and q-axis currents $i_d$ and $i_q$ which are the two phase currents of the rotating coordinate system, converted by the axis conversion unit 310 and the current reference values $i^*_d$ and $i^*_q$ generated by the current reference generation unit 330. For example, the voltage reference generation unit 340 may generate the q-axis voltage reference value $v^*_q$ based on a difference between the q-axis current $i_q$ and the q-axis current reference value $i^*_q$ while performing PI control through a PI controller 344. In addition, the voltage reference generation unit 340 may generate the d-axis voltage reference value $v^*_d$ based on a difference between the d-axis current $i_d$ and the d-axis current reference value $i^*_d$ while performing PI control through a PI controller 348. The voltage reference generation unit 340 may further include a limiter (not shown) that limits levels of the d-axis and q-axis voltage reference values $v^*_d$ and $v^*_q$ such that the d-axis and q-axis voltage reference values $v^*_d$ and $v^*_q$ do not deviate from an allowable range.

The generated d-axis and q-axis voltage reference values $v^*_d$ and $v^*_q$ may be input to the axis conversion unit 350. The axis conversion unit 350 may convert the position $\hat{\theta}_r$ calculated by the speed calculation unit 320 and the d-axis and q-axis voltage reference values $v^*_d$ and $v^*_q$ generated by the voltage reference generation unit 340.

First the axis conversion unit 350 may perform conversion from a two phase rotating coordinate system into a two phase stationary coordinate system. At this time, the position $\hat{\theta}_r$ calculated by the speed calculation unit 320 may be used.

Subsequently, the axis conversion unit 350 may perform conversion from the two phase stationary coordinate system into a three phase stationary coordinate system. Through this conversion, the axis conversion unit 350 may output three phase output voltage reference values v*a, v*b, and v*c.

The switching control signal output unit 360 may generate and output a PWM type inverter switching control signal Sic based on the three phase output voltage reference values v*a, v*b, and v*c. The output inverter switching control signal Sic may be converted into gate driving signals by gate drivers 820a and 820b (see FIG. 8A or 8B) and then input to the gates of the respective switching elements of the inverter 220. As a result, the respective switching elements Sa, S'a, Sb, S'b, Sc and S'c of the inverter 220 perform switching operations.

Figure 6B:
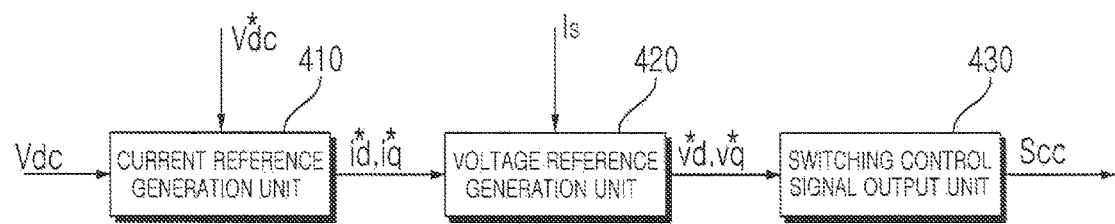
FIG. 6B is an internal block diagram showing an example of converter controller shown in FIG. 5.

FIG. 6B is an internal block diagram showing an example of the converter controller shown in FIG. 5. Referring to FIG. 6B, the converter controller 215 may include a current reference generation unit or generator 410, a voltage reference generation unit or generator 420, and a switching control signal, output unit or output 430.

The current reference generation unit 410 may generate d-axis and g-axis current reference values $i^*_d$ and $i^*_q$ through a PI controller based on the DC terminal voltage Vdc detected by the output voltage detection, unit B, that is, the DC terminal voltage detection unit B, and DC terminal voltage reference value V*dc. The voltage reference generation unit 420 may generate d-axis and q-axis voltage reference values $v^*_d$ and $v^*_q$ through a PI controller based on the d-axis and q-axis current reference values $i^*_d$ and $i^*_q$ and the input current is detected by the input voltage detection unit A. The switching control signal output unit 430 may output the converter switching control signal Scc for driving the switching elements of the converter 210 (see FIG. 5) to the converter 210 based on the d-axis and q-axis voltage reference values $v^*_d$ and $v^*_q$.

Figure 7:
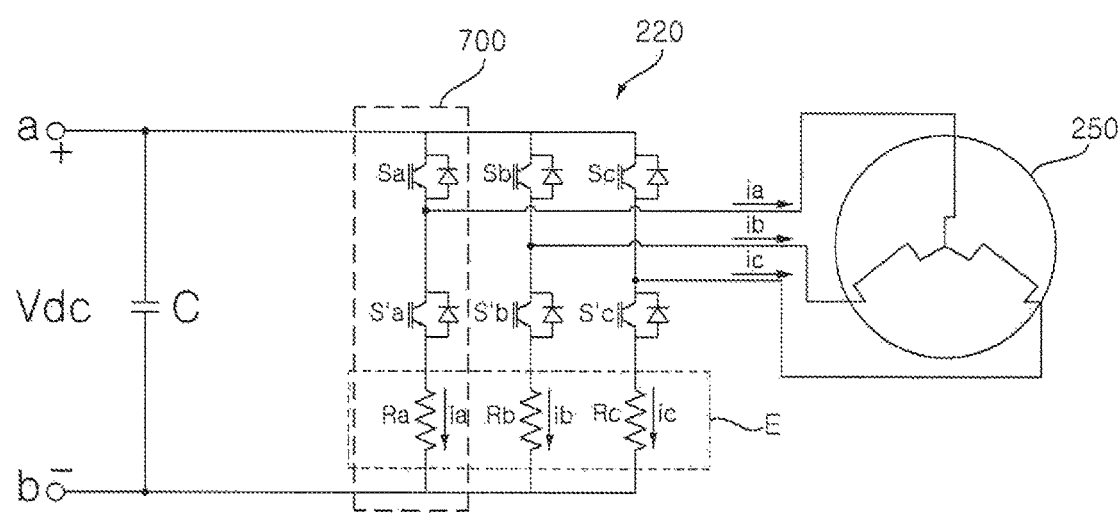
FIG. 7 is a circuit diagram showing an example of an interior of an inverter shown in FIG. 5.

FIG. 7 is a circuit diagram showing an example of an interior of the inverter shown in FIG. 5. Referring to FIG. 7, the inverter 220 may include upper arm switching elements Sa, Sb, and Sc and lower arm switching elements S'a, S'b, and S'c disposed or provided between the terminals (terminals a and b), in a state in which the upper arm switching elements Sa, Sb, and Sc and the lower arm switching elements S'a, S'b, and S'c are connected in series to each other, to output three phase currents ia, ib, and ic to the outdoor fan motor 50. That is, the upper arm switching elements Sa, Sb, and Sc and the lower arm switching elements S'a, S'b, and S'c may be connected in series to each other to form three pairs of upper and lower arm switching elements Sa & S'a, Sb & S'b, and Sc & S'c, which may be connected in parallel to each other.

The output current detection unit E may include shunt resistors Ra, Rb, and Inc, each connected to one end of a corresponding one of the lower arm switching elements S'a, S'b, and S'c, that detect the output current io, that is, the three phase currents ia, ib, and ic.

Each of the switching elements of the inverter 220 may include, for example an insulated gate bipolar transistor (IGBT). To drive the switching elements Sa, S'a, Sb, S'b, Sc, and S'c, gate driving signals may be input to gate terminals. The gate driving signals may be supplied by the gate drivers. On the other hand, gate capacitors that supply power necessary to operate the gate drivers may be used.

After the gate capacitors are charged with gate driving voltage, the gate drivers may be operated. As a result, the switching elements Sa, S'a, Sb, S'b, Sc, and S'c may, perform switching operations.

The following description will be given based on a pair of switching elements or switches 700 in the inverter of FIG. 7.

Figure 8A:
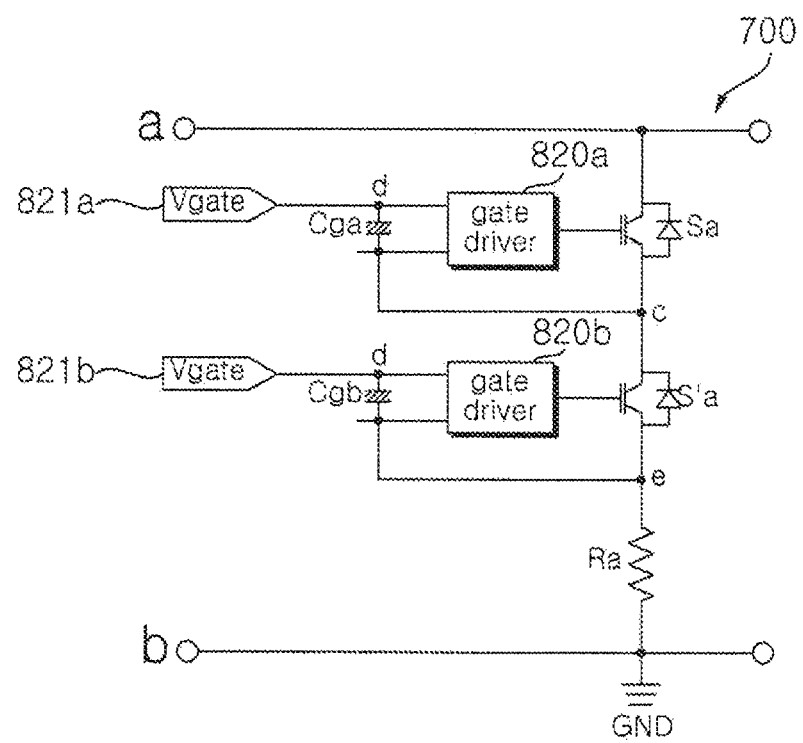
FIGS. 8A to 8C are reference views illustrating operations of a pair of switching elements in the inverter of FIG. 7.
Figure 8B:
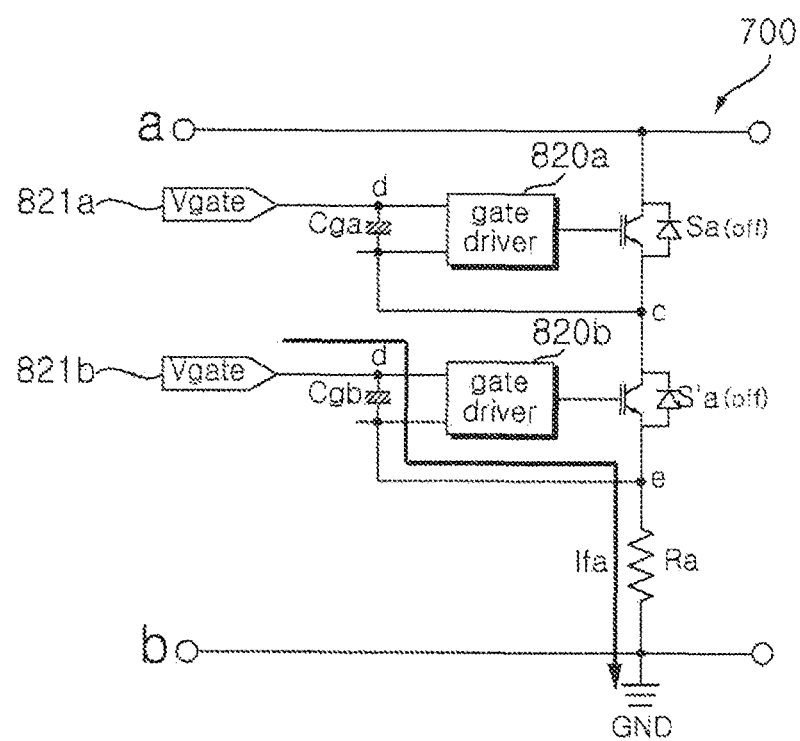
Figure 8C:
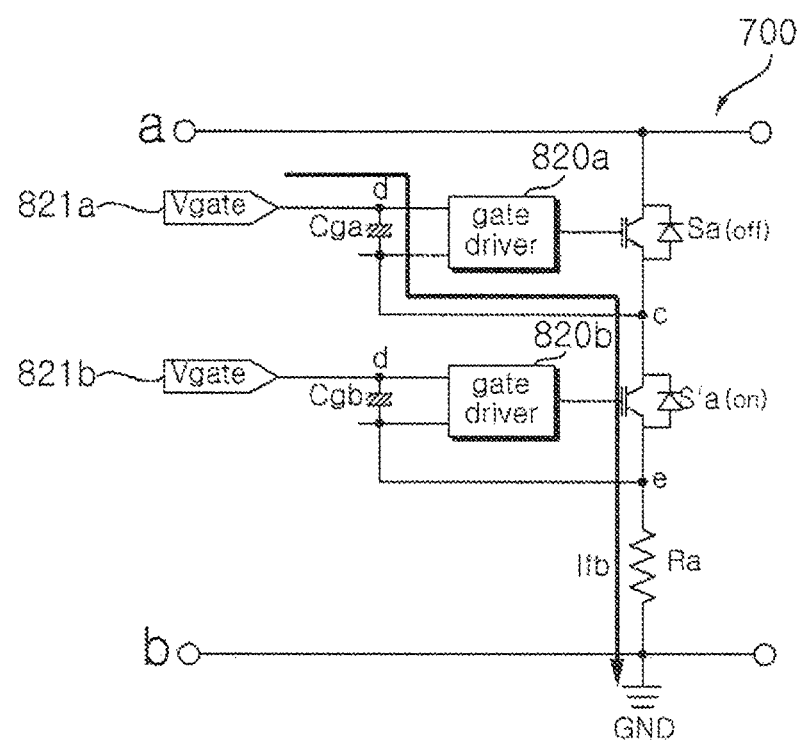

FIGS. 8A to 8C are reference views illustrating operations of a pair of switching elements or switches in the inverter of FIG. 7. FIG. 8A is a circuit diagram showing gate drivers 820a and 820b, gate capacitors Cga and Cgb, a pair of switching elements or switches Sa and S'a, and a resistor element or resistor Ra.

The switching elements Sa and S'a and the resistor element Ra may be connected in series to each other between DC terminals (terminals a and b). That is, the upper arm switching element Sa may be connected between a terminal a and a terminal c, the lower arm switching element S a may be connected between the terminal c and a terminal e, and the resistor element Ra may be connected between the terminal e and a terminal b. In this case, the terminal b may be a ground terminal GND.

Output terminals of the gate drivers 820a and 820b may be connected to gate terminals of the switching elements Sa and S'a. The gate capacitors Cga and Cob that supply a voltage necessary to drive the gate drivers 820a and 820b may be connected between input terminals of the gate driver 820a and between, input terminals of the gate driver 820b, respectively.

Gate driving voltages 821a and 821b may be supplied to the gate capacitors Cga and Cgb, respectively. In this case, each of the gate driving voltages 821a and 821b may be about 15 V.

Hereinafter, a method of charging the gate capacitors Cga and Cgb with the gate driving voltages 821a and 821 b, respectively, will be described with reference to FIGS. 8B and 8C.

FIG. 8B is a view showing a method of charging the gate capacitor Cgb of the gate driver 820b corresponding to the lower arm switching element S'a with the gate driving voltage 821b. Referring to FIG. 8B, even in a case in which both the switching elements Sa and S'a are turned off, current lfa flowing in the gate capacitor Cgb, the resistor element Ra, and the ground terminal GND is formed by the gate driving voltage 821b. As a result, the gate capacitor Cgb is charged with the gate driving voltage 821b.

The method of charging the gate capacitor Cgb of the gate driver 820b corresponding to the lower arm switching element S'a with the gate driving voltage 821b may be controlled by the inverter controller 230. That is, the inverter controller 230 may control all of the upper arm switching elements Sa, Sb, and Sc and the lower arm switching elements S'a S'b, and S'c of the inverter 220 to be turned off before the outdoor fan motor 250 is driven such that the gate capacitors connected between the opposite terminals of the gate drivers corresponding to the lower arm switching elements S'a, S'b, and S'c are charged with the gate driving voltages.

On, the other hand, the upper arm switching element Sa is not connected to the ground terminal but floats. Consequently the gate capacitor Cga is charged with the gate driving voltages 821*a* in a bootstrap fashion.

FIG. 8C is a view showing a method of charging the gate capacitor Cga of the gate driver 820*a* corresponding to the upper arm switching element Sa with the gate driving voltage 821*a*. Referring to FIG. 8C, in a case in which the upper arm switching element Sa, which is one of the switching elements Sa and S'a, is turned off while the lower arm switching element S'a, which is the other of the switching elements Sa and S'a, is turned on, current Ifb flowing in the gate capacitor Cga, the lower arm switching element S'a, the resistor element Ra, and the ground terminal GND is formed by the gate driving voltage 821*a*. As a result, the gate, capacitor Cga is charged with the gate driving voltage 821*a*. That is, the gate capacitor Cga is charged with the gate driving voltages 821*a* in a bootstrap fashion.

The method of charging the gate capacitor Cga of the gate driver 820*a* corresponding to the upper arm switching element Sa with the gate driving voltage 821*a* may be controlled by the inverter controller 230. That is, the inverter controller 230 may control all of the lower arm switching elements S'a, S'b, and S'c, among the upper arm switching elements Sa, Sb, and Sc and the lower arm switching elements S'a, S'b, and S'c of the inverter 220, to be turned on before the outdoor fan motor 250 is driven such that the gate capacitors connected between the opposite terminals of the gate drivers corresponding to the upper arm switching elements Sa, Sb, and Sc are charged with the gate driving voltages.

The gate capacitor of the gate driver corresponding to the lower arm switching element may be charged with the gate driving voltage as shown in FIG. 8B and then the gate capacitor of the gate driver corresponding to the upper arm switching element may be charged with the gate driving voltage as shown in FIG. 8C. Alternatively, the gate capacitor of the gate driver corresponding to the upper arm switching element may be charged with the gate driving voltage as shown in FIG. 8C, and then the gate capacitor of the gate driver corresponding to the lower arm switching element may be charged with the gate driving voltage as shown in FIG. 8B.

The gate capacitor may be charged with the gate driving voltage before the outdoor fan motor is driven. Afterward, an outdoor fan motor alignment period, a motor speed increase period, and a normal motor operation period may be executed.

Figure 10:
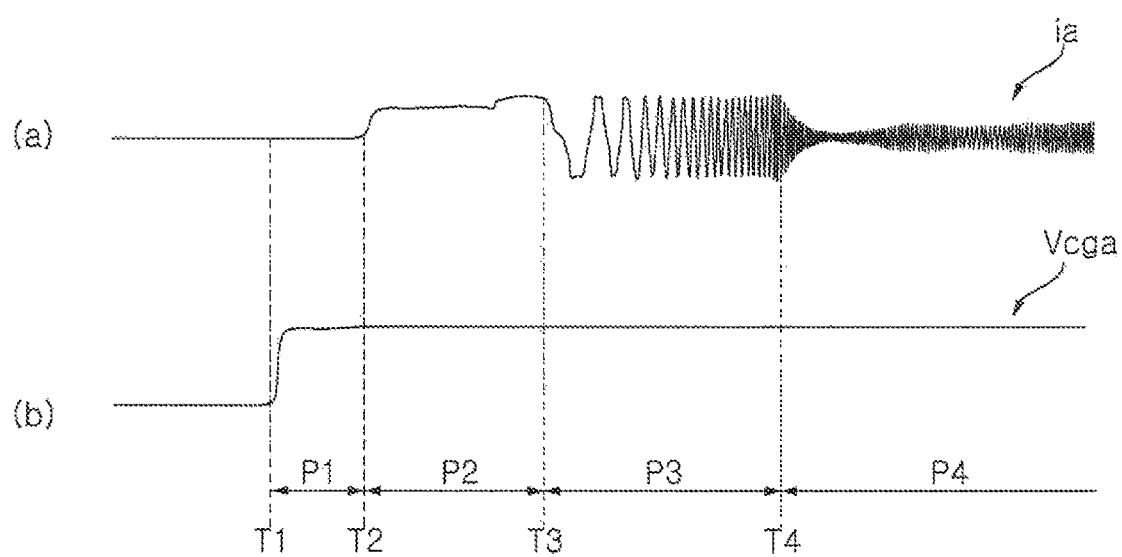
FIGS. 10 to 11E are reference views illustrating the method of FIG. 9.

FIG. 9 is a flowchart showing a method of driving the outdoor fan motor according to an embodiment. FIGS. 10 to 11E are reference views illustrating the method of FIG. 9.

Referring to FIG. 9, the inverter controller 230 may turn on all of the lower arm switching elements S'a, S'b, and S'c before the outdoor fan motor 250 is driven (S910). That is, as shown in FIG. 8C, the inverter controller 230 may turn off all of the upper arm switching elements Sa, Sb, and Sc and turn on all of the lower arm switching elements S'a, S'b, and S'c.

Subsequently, the inverter controller 230 may control the gate capacitors for the upper arm switching elements Sa, Sb, and Sc to be charged with gate driving voltages (S915). As a result, the gate capacitors for the upper arm switching elements Sa, Sb, and Sc may be charged with the gate driving voltages.

On the other hand, the gate capacitors for the lower arm switching elements S'a, S'b; and S'c may be charged with gate driving voltages before the gate capacitors for the upper arm switching elements Sa, Sb, and Sc are charged with the gate driving voltages. After the gate capacitors are charged with the gate driving voltages, the inverter controller 230 may control the outdoor fan motor 250 to be driven.

The output current detection unit E may detect phase currents ia, ib, and ic flowing in the outdoor fan motor 250 during a period during which all of the lower arm switching elements S'a, S'b, and S'c are turned on (S920). The output current detection unit E may detect rate values of the respective phase currents ia, ib, and ic. The detected rate values of the respective phase currents ia, ib and ic may be input to the inverter controller 230. The output current detection unit E may detect peak values of the phase currents ia, ib, and ic.

FIG. 11E is a view exemplarily showing the phase currents ia, ib, and ic flowing in the outdoor fan motor 250. The output current detection unit E may detect only peak value periods ienv of the respective phase currents ia, ib, and ic, and input only detected peak value levels to the inverter controller 230.

The inverter controller 230 may determine the intensity of external wind based on the detected peak value levels of the respective phase currents ia, ib, and ic. In particular, the inverter controller 230 may determine the intensity of external wind based on phase currents ia, ib, and ic sensed during gate capacitor charging periods before the outdoor fan motor 250 is driven. Consequently, it is not necessary to provide an additional external wind determination period, whereby it is possible to rapidly drive the outdoor fan motor 250.

The detected, peak value levels of the respective phase currents ia ib, and ic increase as the intensity of the external wind increases. Accordingly to embodiments disclosed herein, therefore, the motor driving method may be changed based on the detected peak value levels of the respective phase currents ia, ib, and ic.

The inverter controller 230 may determine whether the detected levels of the phase currents are higher than a first level (S925). Upon determining that the detected levels of the phase currents are higher than the first level, operation or step S930 may be carried out.

The inverter controller 230 may determine whether the detected levels of the phase currents are higher thane second level higher than the first level (S930). Upon determining that the detected levels of the phase currents are higher than the second level, the inverter controller 230 may determine that the external wind is strong such that the outdoor fan motor 250 cannot be driven due to the external wind, and control the outdoor fan motor 250 to be temporarily stopped (S945).

Upon determining that the detected levels of the phase currents are between the first level and the second level, the inverter controller 230 may execute the motor alignment period and then control the outdoor fan motor 250 to be rotated in a first direction and then to be rotated in a second direction opposite to the first direction during the motor speed increase period after the motor alignment period (S935).

More particularly, in a case in which the outdoor fan motor 250 is rotated in the reverse direction due to the external wind, the inverter controller 230 may control the outdoor fan motor 250 to be rotated in the reverse direction and then to be rotated in the forward direction during the motor speed increase period. As a result, it is possible to stably drive the outdoor fan motor 250 even when the outdoor fan is rotated by the external wind.

Upon determining that the detected levels of the phase currents are lower than the first level, the inverter controller 230 may execute the motor alignment period and then control the outdoor fan motor 250 to be continuously rotated in the second direction during the motor speed increase period after the motor alignment period (S940). That is, in a case which the intensity of the external wind is weak, the inverter controller 230 may control the outdoor fan motor 250 to be continuously rotated in the forward direction during the motor speed increase period even when the outdoor fan motor 250 is rotated in the reverse direction. In this case, a possibility of stall occurrence is low. Consequently, it is possible to drive the outdoor fan motor 250 in a conventional driving mode.

FIG. 10 is a view showing a phase current and a gate capacitor voltage based on a general motor driving mode. Referring to FIG. 10, a gate capacitor is charged with a gate capacitor voltage during a period P1 before the outdoor fan motor 250 is driven. For example, a gate capacitor Cga associated with a first upper arm switching element may be charged with gate capacitor voltage Vcga.

In the mode shown in FIG. 10, no phase current flowing in the outdoor fan motor 250 is detected during the period P1, and therefore, the intensity of external wind is not determined based on the phase current. After the period P1, the inverter controller 230 may control an alignment period for aligning a rotor of the outdoor fan motor 250, that is, a motor alignment period P2, to be executed. At this time, a constant phase current may be supplied to the outdoor fan motor 250.

Subsequently, after the period P2, the inverter controller 230 may control a motor speed increase period P3, during which the speed of the outdoor fan motor 250 is continuously increased, to be executed. Subsequently, after the period P3, the inverter controller 230 may control a normal motor operation period P4, during which the outdoor fan motor 250 is normally operated, to be executed.

In the mode shown in FIG. 10, a possibility of stall occurrence may be high especially during the period P2 or the period P3 when the outdoor fan motor 250 is driven if the intensity of the external wind is high. As a result the outdoor fan motor 250 may be unstably driven. In order to prevent the occurrence of such a stall phenomenon, the outdoor fan motor 250 may be driven as shown in FIGS. 11A to 11D according to embodiments disclosed herein.

Figure 11A:
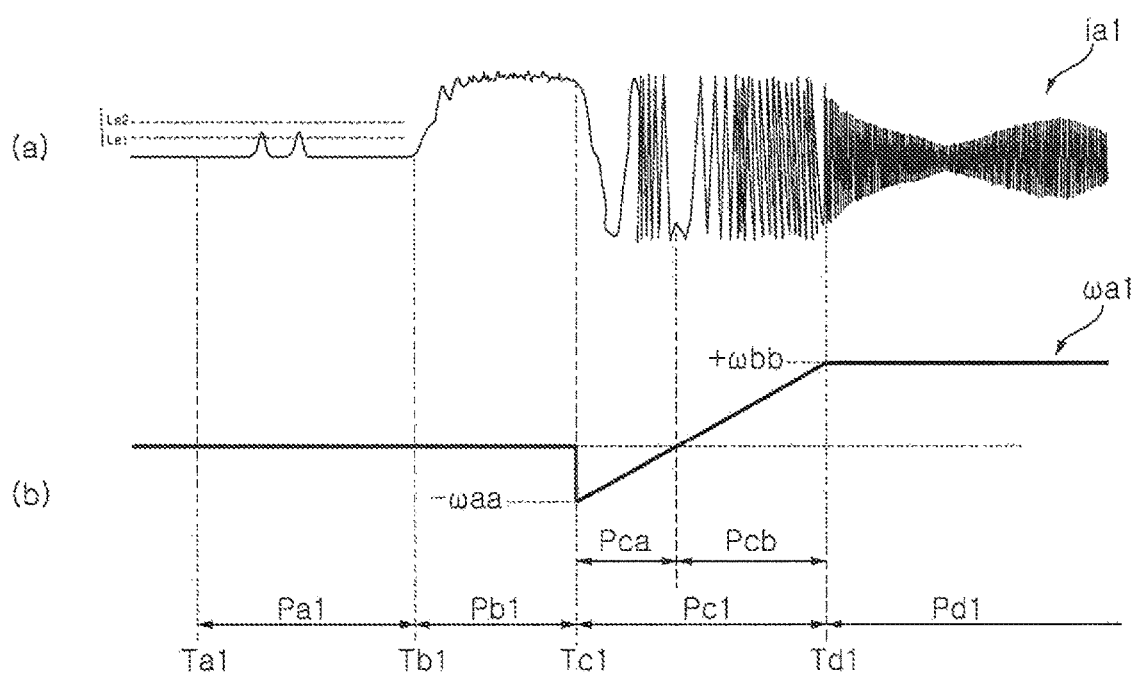

FIG. 11A is a view showing a phase current ia1 and a motor rotation speed ωa1 based on a motor driving mode according to an embodiment in a case in which a detected level of a phase current is between a first level, and a second level as at operation or step S935. Referring to FIG. 11A, the inverter controller 230 may control a gate capacitor charging period Pa1, a motor alignment period Pb1, a motor speed increase period Pc1, and a normal motor operation period Pd1 to be individually executed.

During the gate capacitor charging period Pa1, the inverter controller 230 may control the gate capacitors for the upper arm switching element and the lower arm switching element to be charged with gate driving voltages as shown in FIGS. 8B and 8C. In particular, the output current detection unit E may detect phase currents ia, ib, and ic flowing in the outdoor fan motor 250 while the lower arm switching element is turned on to charge the gate capacitor for the upper arm switching element with the gate driving voltage.

In a case in which a level of a phase current flowing in the outdoor fan motor 250 is between a first level $i_{Le1}$ and a second level $i_{Le2}$ during the gate capacitor charging period Pa1, the inverter controller 230 may control the outdoor fan motor 250 to be rotated in the reverse direction and in the forward direction during the motor speed increase period Pc1 as previously described.

As shown in FIG. 11A, the level of the phase current is generally uniform during the motor alignment period Pb1. The motor rotation speed may be 0 during the gate capacitor charging period Pa1 and the motor alignment period Pb1.

During the motor speed increase period Pc1, the rotational speed of the motor may be continuously increased. More specifically, the outdoor fan motor 250 may be rotated at a speed of −ωaa at a time point Tc1, and may be rotated at a speed of ωbb at a time point Td1.

FIG. 11B(a) exemplarily shows that the outdoor fan 105a is rotated in a counterclockwise direction Rccw, and FIG. 11B(b) exemplarily shows that the outdoor fan 105a is rotated in a clockwise direction Rcw. That is, the outdoor fan motor 250 may be rotated in the reverse direction as shown in FIG. 11B(a) during a portion Pea of the motor speed increase period Pc1. On the other hand, the outdoor fan motor 250 may be rotated in the forward direction as shown in FIG. 11B(b) during a portion Pcb of the motor speed increase period Pc1.

The motor speed increase period Pc1 may be a period during which feedback control based on phase current detection may not be performed but open loop control may be performed. More specifically, the motor speed increase period Pc1 may be a period during which the speed of the outdoor fan motor 250 may be continuously increased to a target speed reference value. In a case in which outdoor fan motor 250 is rotated in the reverse direction and is then rotated in the forward direction in consideration of external wind as described above, a possibility of stall occurrence may be lowered with the result that it is possible to stably drive the outdoor fan motor 250.

Alternatively the inverter controller 230 may control the outdoor fan motor 250 to be rotated ire a first direction be temporarily stopped, and to be rotated in a second direction during the speed increase period of the outdoor fan motor 250. That is, the speed increase period of the outdoor fan motor 250 may include a temporary stop period.

Subsequently, during the normal motor operation period Pd1 the inverter controller 230 may perform feedback control based on the detected phase current and, control the outdoor fan motor 250 to be driven in response to a variable load while varying at least one selected from a frequency and a magnitude of an output voltage or an output current applied to the outdoor fan motor 250.

FIG. 11A shows by way of example that the rotational speed of the outdoor fan motor 250 is constant, that is, the outdoor fan motor 250 is continuously rotated at a speed of ωbb, during the normal motor operation period Pd1. Alternatively, the rotational speed of the outdoor fan motor 250 may be variable.

In a case in which the level of the phase current is between the first level and the second level but is closer to the second level, the inverter controller 230 may control the magnitude of the speed −ωaa or ωbb to be further increased. Alternatively, the inverter controller 230 may control a motor speed increase gradient of the motor speed increase period Pc1 to be further increased.

Figure 11C:
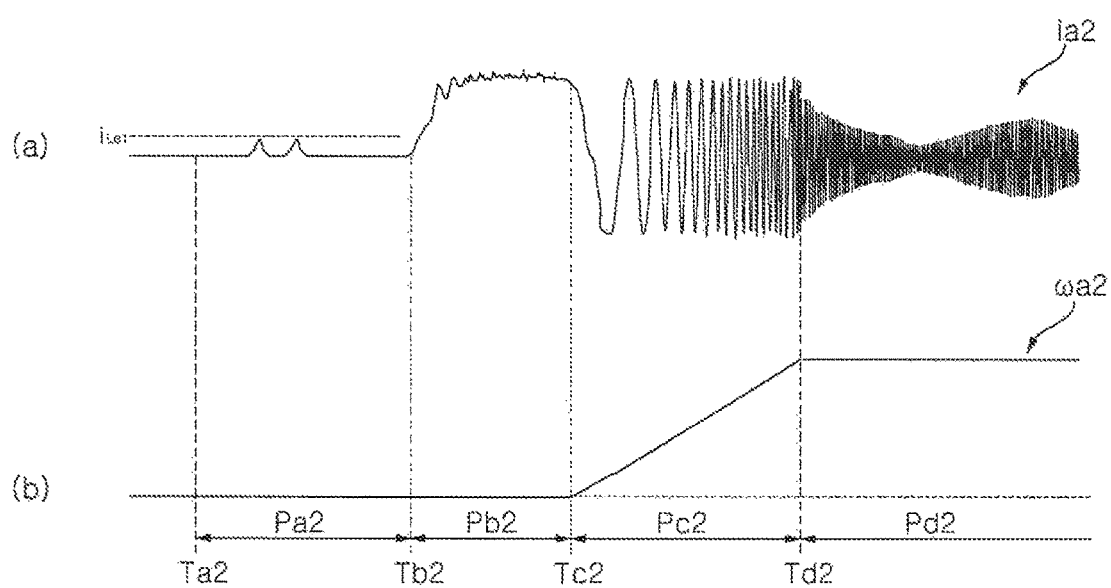

FIG. 11C is a view showing a phase current ia2 and a motor rotation speed ωa2 based on a motor driving mode according to an embodiment in a case in which a detected level of a phase current is lower than a first level as at operation or step S940. Referring to FIG. 11C, the inverter controller 230 may control a gate capacitor charging period Pa2, a motor alignment period Pb2, a motor speed increase period Pc2, and a normal motor operation period Pd2 to be individually executed.

In describing the difference between FIG. 11C and FIG. 11A, the inverter controller 230 may control the speed of the outdoor fan motor 250 to be continuously increased while the outdoor fan motor 250 is rotated in the forward direction without being rotated in the reverse direction during the motor speed increase period Pc2. During the motor speed increase period Pc2, therefore, the speed of the outdoor fan, motor 250 may be continuously increased from 0. In a case in which the intensity of external wind is low, as shown in FIG. 11C, it is possible to stably drive the outdoor fan motor 250 even when the outdoor fan motor 250 is rotated in the forward direction without being rotated in the reverse direction.

Figure 11D:
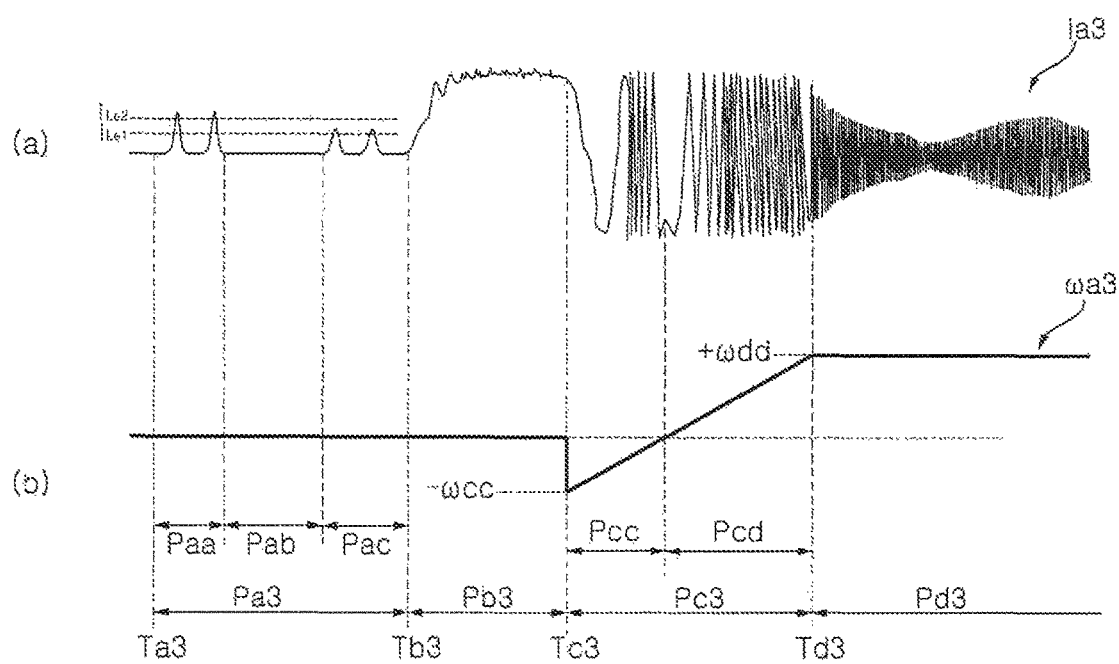
Figure 11E:
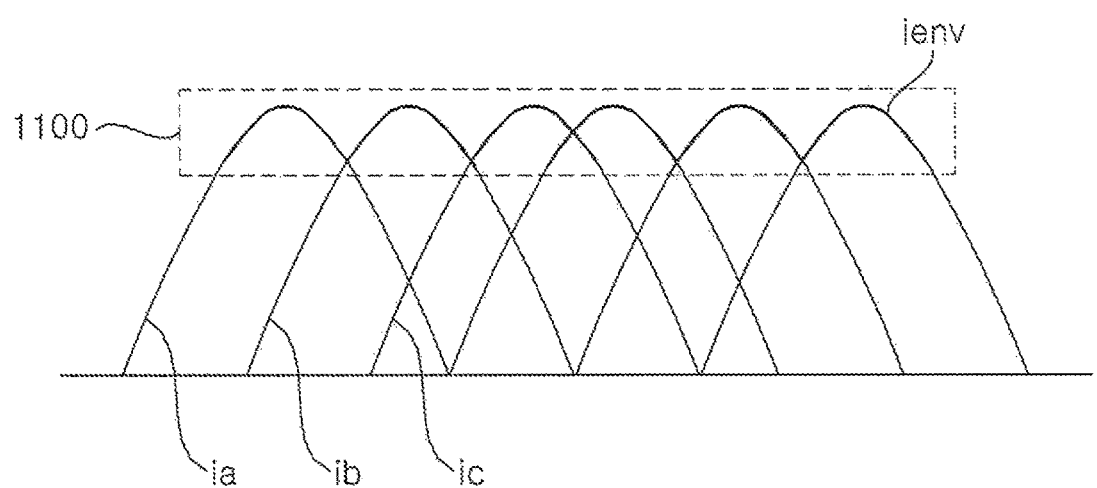

FIG. 11D is a view showing a phase current ia3 and a motor rotation speed ωa3 based on a motor driving mode according to an embodiment in a case in which a detected level of a phase current is higher than a second level as at operation or step S945. Referring to FIG. 11D the inverter controller 230 may control a gate capacitor charging period Pa3, a motor alignment period Pb3, a motor speed increase period Pc3, and a normal motor operation period Pd3 to be individually executed.

In describing the difference between FIG. 11D and FIG. 11A, the inverter controller 230 may control the outdoor fan motor 250 to be temporarily stopped in a case in which a level of a phase current detected during the gate capacitor charging period Pa3 is higher than a second level $i_{Le2}$ (period Paa). In FIG. 11D, the outdoor fan motor 250 is temporarily stopped during a period Pab.

After the period Pab, the inverter controller 230 may determine whether levels of phase currents ia, ib, and ic flowing in the outdoor fan motor 250 are between the first level and the second level in a state in which all of the lower arm switching elements S'a, S'b, and S'c are turned on. In a case in which the levels of the phase currents ia, ib, and ic flowing in the outdoor fan, motor 250 are between the first level and the second level (period Pac), the inverter controller 230 may control the speed of the outdoor fan motor 250 to be increased while the outdoor fan motor 250 is rotated in the second direction during the speed increase period of the outdoor fan motor 250 after the motor alignment period Pb3, during which the rotor of the outdoor fan motor 250 is aligned, when the outdoor fan motor 250 is driven. That is, the inverter controller 230 may control the outdoor fan motor 250 to be driven during the motor alignment period Pb3, the motor speed increase period Pc3, and the normal motor operation period Pd3, as shown in FIG. 11D.

A motor speed increase gradient of the motor speed increase period Pc3 of FIG. 11D may be higher than a motor speed increase gradient of the motor speed increase period Pc1 of FIG. 11A. That is, the inverter controller 230 may control the motor speed increase gradient of the motor speed increase period Pc3 of FIG. 11D to be higher than the motor speed increase gradient of the motor speed increase period Pc1 of FIG. 11A in consideration of the temporary stop period.

FIG. 12 is a flowchart showing a method of driving an outdoor fan motor according to another embodiment. Referring to FIG. 12, the inverter controller 230 may turn on all of the lower arm switching elements S'a, S'b, and S'c before the outdoor fan motor 250 is driven (S1210). That is, as shown in FIG. 8C, the inverter controller 230 may turn off all of the upper arm switching elements Sa, Sb, and Sc and turn on all of the lower arm switching elements S'a, S'b, and S'c.

Subsequently, the inverter controller 230 may control the gate capacitors for the upper arm switching elements Sa, Sb, and Sc to be charged with gate driving voltages (S1215). As a result, the gate capacitors for the upper arm switching elements Sa, Sb, and Sc may be charged with the gate driving voltages.

The gate capacitors for the lower arm switching elements S'a, S'b, and S'c may be charged with gate driving voltages before the gate capacitors for the upper arm switching elements Sa, Sb, and Sc are charged with the gate driving voltages. After the gate capacitors are charged with the gate driving voltages, the inverter controller 230 may control the outdoor fan motor 250 to be driven.

The output current detection unit E may detect phase currents ia, ib, and ic flowing in the outdoor fan motor 250 during a period during which all of the lower arm switching elements S'a, S'b, and S'c are turned on (S1220). The output current detection unit E may detect rate values of the respective phase currents ia, ib, and ic. The detected rate values of the respective phase currents is, ib, and ic may be input to the inverter controller 230. The output current detection unit E may detect peak values of the phase currents ia, ib, and ic.

The inverter controller 230 may determine whether the detected levels of the phase currents are higher than a second level (S1230). Upon determining that the detected levels of the phase currents are higher than the second level, the inverter controller 230 may determine that the external wind is strong such that the outdoor fan motor 250 cannot be driven due to the external wind, and control the driving of the outdoor fan motor 250 to be temporarily stopped while controlling the compressor motor to be continuously driven (S1245).

For example, the inverter controller 230 may transmit a temporary stop signal indicating that the driving of the outdoor fan motor 250 has been temporarily stopped to the controller 170. As a result, the controller 170 may recognize that the driving of the outdoor fan motor 250 has been temporarily stopped. Nevertheless, the controller 170 may control the compressor driving unit 113 to drive the compressor 102.

The inverter controller 230 may determine whether the detected levels of the phase currents are lower than the second level after a predetermined time (S1250). That is, the inverter controller 230 may determine whether the levels of the phase currents ia, ib, and ic flowing in the outdoor fan motor 250 are lower than the second level during the period during which all of the lower arm switching elements S'a, S'b, and S'c are turned on.

In a case in which the intensity of external wind is decreased, and thus, the levels of the phase currents ia, ib, and ic flowing in the outdoor fan motor 250 are lower than the second level, the inverter controller 230 may control the outdoor fan motor 250, which is temporarily stopped, to be driven (S1255). For example, in a case in which the levels of the phase currents ia, ib, and ic flowing in the outdoor fan motor 250 are between the first level and the second level, the inverter controller 230 may control the outdoor fan motor 250 to be driven as shown in FIG. 11A. On the other hand, in a case in which the levels of the phase currents ia, ib, and ic flowing in the outdoor fan motor 250 are lower than the first level, the inverter controller 230 may control the outdoor fan motor 250 to be driven as shown in FIG. 11C.

When the outdoor fan motor 250, which is temporarily stopped, is driven, the compressor 102 may be continuously driven. As a result, the outdoor fan-motor 250 may be temporarily stopped and then driven even when the intensity of the external wind is temporarily high. Consequently, it is not necessary to stop the overall operation of the air conditioner, thereby improving operational efficiency of the air conditioner.

Figure 13A:
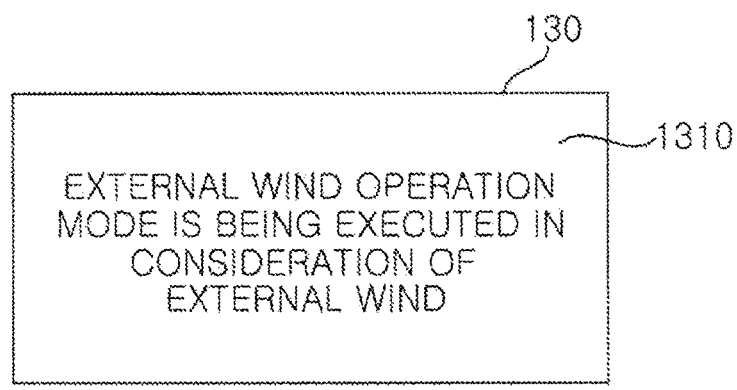
FIGS. 13A to 13D are views exemplarily showing various kinds of information displayed on a display according to external wind.

FIGS. 13A to 13D are views exemplarily showing various kinds of information displayed on the display according to external wind. FIG. 13A exemplarily shows that an external wind operation mode message 1310 may be output to the display 130 according to the intensity of the external wind. That is, in a case in which the outdoor fan motor 250 is rotated by external wind, in a state in which all of the upper arm switching elements S'a, S'b, and S'c, among the upper arm switching elements Sa, Sb, and Sc and the lower arm switching elements S'a, S'b, and S'c of the inverter 220, are turned on before the outdoor fan motor 250 is driven, with the result that levels of the phase currents ia, ib, and is flowing in the outdoor fan motor 250 are between the first level and the second level the inverter controller 230 or the controller 170 may control the external wind operation mode message 1310 to be displayed on the display 130.

Figure 13B:
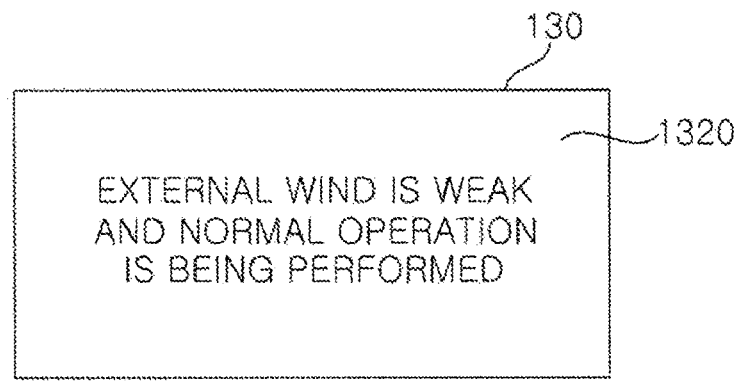

FIG. 13B exemplarily shows that the external wind is weak, and therefore, a normal operation message 1320 indicating that the air conditioner is operated irrespective of the external wind may be output to the display 130. That is, in a case in which the outdoor fan motor 250 is rotated by external wind, in a state in which all of the lower arm switching elements S'a, S'b, and S'c, among the upper arm switching elements Sa, Sb, and Sc and the lower arm switching elements S'a, S'b, and S'c of the inverter 220, are turned on before the outdoor fan motor 250 is driven, with the result that levels of the phase currents ia, ib, and ic flowing in the outdoor fan motor 250 are lower than the first level, the inverter controller 230 or the controller 170 may control the normal operation message 1320 to be displayed on the display 130.

Figure 13C:
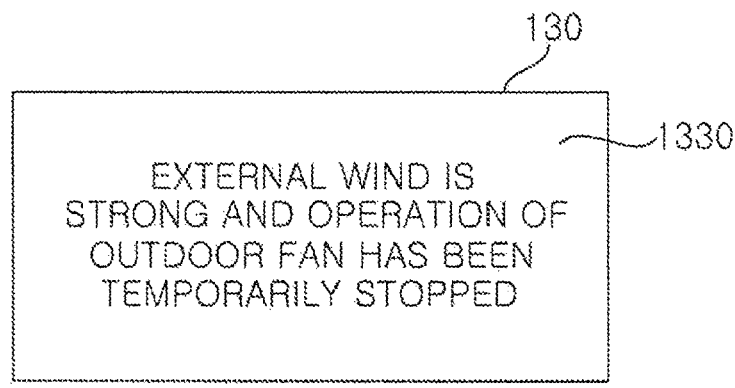
Figure 13D:
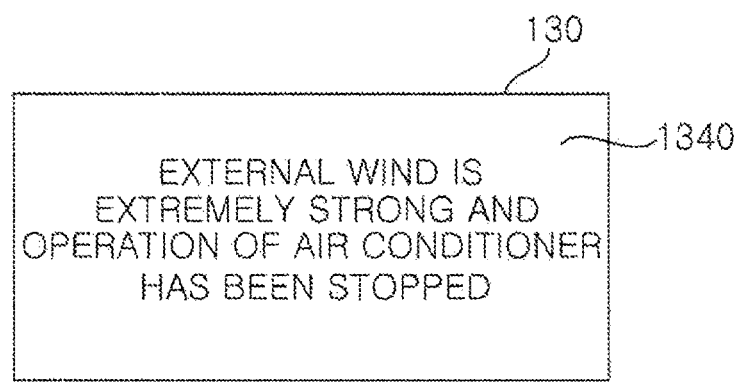

FIG. 13C exemplarily shows that the external wind is strong, and therefore, a message 1330 indicating that, the operation of the outdoor fan has been temporarily stopped is output to the display 130. FIG. 13D exemplarily shows that the external wind is extremely strong, and therefore a message 1340 indicating that the operation of the air conditioner has been stopped is output to the display 130.

That is, in a case in which the outdoor fan motor 250 is rotated by external wind, in a state in which all of the lower arm switching elements S'a, S'b, and S'c, among the upper arm switching elements Sa, Sb, and Sc and the lower arm switching elements S'a, S'b, and S'c of the inverter 220, are turned on before the outdoor fan motor 250 is driven, with the result that levels of the phase currents ia, ib, and ic flowing in the outdoor fan motor 250 are higher than the second level, which is higher than the first level, the inverter controller 230 or the controller 170 may control the message 1330 indicating that the operation of the outdoor fan has been temporarily stopped or the message 1340 indicating that the operation of the air conditioner has been stopped to be displayed on the display 130.

Consequently, it is possible for a user to easily and conveniently recognize an operation mode based on the external wind through the respective messages as described above.

The outdoor fan motor driving device according to embodiments disclosed herein and the air conditioner including the same may not be limitedly applied to the construction and method of the embodiments as previously described; however, all or some of the embodiments may be selectively combined to achieve various modifications.

The operation method of the outdoor fan motor driving device or the air conditioner according to embodiments disclosed herein may be realized as code, which is readable by a processor included in the outdoor fan motor driving device or the air conditioner, in recording media readable by the processor. The recording media readable by the processor include all kinds of recording devices to store data which are readable by the processor. Examples of the recording media readable by the processor may include a read only memory (ROM), a random access memory (RAM), a compact disc read only memory (CD-ROM), a magnetic tape, a floppy disk, and an optical data storage device. In addition, the recording media readable by the processor may also be realized in the form of a carrier wave, such as transmission through the Internet. Further, the recording media readable by the processor may be distributed to computer systems connected to each other through a network such that code readable by the processor is stored or executed in a distributed manner.

As is apparent from the above description an outdoor fan motor driving device according to embodiment disclosed herein may include an inverter to convert DC power into AC power according to a switching operation and to output the converted AC power to an outdoor fan motor, an output current detection unit or detector to detect phase currents flowing in the outdoor fan motor, and a controller to control the inverter based on the detected phase currents. In a case in which the outdoor fan motor is rotated by external wind, in a state in which all of lower arm switching elements, among upper arm switching elements and lower arm switching elements of the inverter, are turned on before the outdoor fan motor is driven, with the result that levels of the phase currents flowing in the outdoor fan motor are between a first level and a second level, the controller may control the outdoor fan motor such that a speed of the outdoor fan motor is increased while the outdoor fan motor routed in a first direction and then rotated in a second direction opposite to the first direction during a motor speed increase period after an alignment period during which a rotor of the outdoor fan motor is aligned when the outdoor fan motor is driven. Consequently, it is possible to stably drive the outdoor fan motor even when the outdoor fan is rotated by the external wind.

In a case in which the external wind is strong, and therefore the levels of the phase currents flowing in the outdoor fan motor are higher than the second level, the controller may control the outdoor fan motor such that driving of the outdoor fan motor is temporarily stopped and then the driving of the outdoor fan motor is resumed after a predetermined time. Consequently, it is possible to stably drive the outdoor fan motor.

When gate capacitors are charged with a gate driving voltage before the outdoor fan motor is driven, the controller may determine the intensity of the external wind based on the detected phase currents of the outdoor fan motor. Consequently, it is possible to easily and conveniently determine the intensity of external wind without assignment of an additional determination time.

In a case in which the levels of the phase currents flowing in the outdoor fan motor are higher than the second level, the controller may control the outdoor fan motor such that driving of the outdoor fan motor is temporarily stopped while a compressor motor is continuously operated to drive a compressor. Consequently, it is possible to continuously drive the compressor. In addition, the controller may control an operation mode of the air conditioner based on the external wind to be displayed through an additional display, thereby improving user convenience.

Embodiments disclosed herein provide an outdoor fan motor driving device capable of stably driving an outdoor fan motor even when an outdoor fan is rotated by external wind and an air conditioner including an outdoor fan motor driving device.

Embodiments disclosed herein further provide an outdoor fan motor driving device including an inverter to convert DC power into AC power according to a switching operation and to output the converted AC power to an outdoor fan motor, an output current detection unit or detector to detect phase currents flowing in the outdoor fan motor, and a controller to control the inverter based on the detected phase currents. In a case in which the outdoor fan motor is rotated by external wind, in a state in which all of lower arm switching elements, among upper arm switching, elements and lower arm switching elements of the inverter, are turned on before the outdoor fan motor is driven, with the result that levels of the phase currents flowing in the outdoor fan motor are between a first level and a second level, the controller may control the outdoor fan motor such that a rotational speed of the outdoor fan motor may be increased while the outdoor fan motor is rotated in a first direction and then rotated in a second direction opposite to the first direction during a speed increase period of the outdoor fan motor after an alignment period during which a rotor of the outdoor fan motor is aligned when the outdoor fan motor is driven.

Embodiments disclosed herein further provide an air conditioner including an inverter to convert DC power into AC power according to a switching operation and to output the converted AC power to an outdoor fan motor, an output current detection unit or detector to detect phase currents flowing in the outdoor fan motor, and a controller to control the inverter based on the detected phase currents. In a case in which the outdoor fan motor is rotated by external wind, in a state in which all of lower arm switching elements, among upper arm switching elements and lower arm switching elements of the inverter, are turned on before the outdoor fan motor is driven, with the result that levels of the phase currents flowing in the outdoor fan motor are between a first level and a second level, the controller may control the outdoor fan motor such that a rotational speed of the outdoor fan motor may be increased while the outdoor fan motor is rotated in a first direction and then rotated in a second direction opposite to the first direction during a speed increase period of the outdoor fan motor after an alignment period during which a rotor of the outdoor fan motor is aligned when the outdoor fan motor is driven.

Embodiments disclosed herein further provide an air conditioner including a compressor motor to drive a compressor, an outdoor fan motor to drive an outdoor fan, an inverter to convert DC power into AC power according to a switching operation and to output the converted AC power to the outdoor fan motor, an output current detection unit or detector to detect phase currents flowing in the outdoor fan motor and a controller to control the inverter based on the detected phase currents. In a case in which the outdoor fan motor is rotated by external wind, in a state in which all of lower arm switching elements, among upper arm switching elements and lower arm switching elements of the inverter, are turned on before the outdoor fan motor is driven, with the result that levels of the phase currents flowing in the outdoor fan motor are higher than a second level, which is higher than a first level, the controller may control the outdoor fan motor such that driving of the outdoor fan motor may be temporarily stopped while the compressor motor to drive the compressor is continuously operated.

It will be apparent that, although embodiments have been shown and described above, embodiments are not limited to the above-described embodiments, and various modifications and variations can be made by those skilled the art without departing from the gist of the appended claims. Thus, it is intended that the modifications and variations should not be understood independently of the technical spirit or prospect.

Any reference in this specification to "one embodiment," "an embodiment," "example embodiment," etc., means that a particular feature, structure, or characteristic described in connection with the embodiment is included in at least one embodiment. The appearances of such phrases in various, places in the specification are not necessarily all referring to the same embodiment. Further, when a particular feature, structure, or characteristic is described in connection with any embodiment it is submitted that it is within the purview of one skilled in the art to effect such feature, structure, ear characteristic in connection with other ones of the embodiments.

Although embodiments have been described with reference to a number of illustrative embodiments thereof, it, should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements alternative uses will also be apparent to those skilled in the art.

What is claimed is:

1. An outdoor fan motor drive, comprising:
   an inverter to convert DC power into AC power according to a switching operation and to output the converted AC power to an outdoor fan motor;
   an output current detector to detect phase currents flowing in the outdoor fan motor; and
   a controller to control the inverter based on the detected phase currents, wherein when the outdoor fan motor is rotated by external wind, in a state in which all of lower arm switching elements, among upper arm switching elements and lower arm switching elements of the inverter, are turned on before the outdoor fan motor is driven, with the result that levels of the phase currents flowing in the outdoor fan motor are between a first level and a second level, the controller controls the outdoor fan motor such that a rotational speed of the outdoor fan motor is increased while the outdoor fan motor is rotated in a first direction and then rotated in a second direction opposite to the first direction during a speed increase period of the outdoor fan motor after an alignment period during which a rotor of the outdoor fan motor is aligned when the outdoor fan motor is driven.

2. The outdoor fan motor drive according to claim 1, wherein when the levels of the phase currents flowing in the outdoor fan motor are lower than the first level in a state in which all of the lower arm switching elements, among the upper arm switching elements and the lower arm switching elements of the inverter, are turned on before the outdoor fan motor is driven, the controller controls the outdoor fan motor such that the speed of the outdoor fan motor is increased while the outdoor fan motor is rotated in the second direction during the speed increase period of the outdoor fan motor after the alignment period during which the rotor of the outdoor fan motor is aligned when the outdoor fan motor is driven.

3. The outdoor fan motor drive according to claim 1, wherein in a when the outdoor fan motor is rotated by the external wind, in a state in which all of the lower arm switching elements, among the upper arm switching elements and the lower arm switching elements of the inverter, are turned on before the outdoor fan motor is driven, with the result that the levels of the phase currents flowing in the outdoor fan motor are higher than the second level, the controller controls the outdoor fan motor such that driving of the outdoor fan motor is temporarily stopped and then the driving of the outdoor fan motor is resumed after a period predetermined time.

4. The outdoor fan motor drive according to claim 3, wherein when the levels of the phase currents flowing in the outdoor fan motor are higher than the second level, the controller controls the outdoor fan motor such that the driving of the outdoor fan motor is temporarily stopped while a compressor motor to drive a compressor is continuously operated.

5. The outdoor fan motor drive according to claim 1, wherein the second direction is a direction in which heat exchange is performed more efficiently than in the first direction.

6. The outdoor fan motor drive according to claim 1, further including:
- gate drivers to supply gate driving signals to the upper arm switching elements and the lower arm switching elements of the inverter; and
- gate capacitors connected between opposite terminals of the gate drivers, wherein the controller controls all of the lower arm switching elements, among the upper arm switching elements and the lower arm switching elements of the inverter, to be turned on before the outdoor fan motor is driven such that the gate capacitors connected between the opposite terminals of the gate drivers corresponding to the upper arm switching elements are charged with the gate driving voltages.

7. The outdoor fan motor drive according to claim 6, wherein the controller controls the gate capacitors connected between the opposite terminals of the gate drivers corresponding to the lower arm switching elements to be charged with the gate driving voltages before the outdoor fan motor is driven.

8. The outdoor fan motor drive according to claim 1, wherein the controller controls a frequency of the phase currents flowing in the outdoor fan motor to be varied during a normal operation period after the motor speed increase period.

9. The outdoor fan motor drive according to claim 8, wherein the controller controls peak values of the levels of the phase currents flowing in the outdoor fan motor during the normal operation period after the motor speed increase period to be lower than peak values of the levels of the phase currents during the motor speed increase period.

10. The outdoor fan motor drive according to claim 1, wherein when the outdoor fan motor is rotated by the external wind, in a state in which all of the lower arm switching elements, among the upper arm switching elements and the lower arm switching elements of the inverter, are turned on before the outdoor fan motor is driven, with the result that the levels of the phase currents flowing in the outdoor fan motor are between the first level and the second level, the controller controls the speed of the outdoor fan motor in the first direction to be increased during the motor speed increase period or a motor speed increase gradient of the motor speed increase period to be increased as the levels of the phase currents are increased.

11. The outdoor fan motor drive according to claim 1, wherein when the outdoor fan motor is rotated by the external wind, in a state in which all of the lower arm switching elements, among the upper arm switching elements and the lower arm switching elements of the inverter, are turned on before the outdoor fan motor is driven, with the result that the levels of the phase currents flowing in the outdoor fan motor are between the first level and the second level, the controller controls the outdoor fan motor to be rotated in the first direction, to be temporarily stopped, and to be rotated in the second direction during the motor speed increase period.

12. The outdoor fan motor drive according to claim 1, wherein the controller includes:
- a speed calculator to calculate the rotational speed of the outdoor fan motor based on the phase currents;
- a current reference generator to generate a current reference value based on the calculated speed and a speed reference value;
- a voltage reference generator to generate a voltage reference value based on the current reference value; and
- a switching control signal output to output an inverter switching control signal based on the voltage reference value.

13. The outdoor fan motor drive according to claim 1, further including:
- a converter to convert input AC power into DC power;
- an input current detector to detect an input current from the input AC power
- a DC terminal voltage detector to detect a DC terminal voltage applied between DC terminals, which are output terminals of the converter; and
- a converter controller to output a converter switching control signal for controlling a switching element of the converter based on the input current and the DC terminal voltage.

14. An air conditioner including the outdoor fan motor drive according to claim 1.

15. An air conditioner, comprising:
- a compressor motor to drive a compressor;
- an outdoor fan motor to drive an outdoor fan;
- an inverter to convert DC power into AC power according to a switching operation and to output the converted AC power to the outdoor fan motor;
- an output current detector to detect phase currents flowing in the outdoor fan motor; and
- a controller to control the inverter based on the detected phase currents, wherein when the outdoor fan motor is rotated by external wind, in a state in which all of lower arm switching elements, among upper arm switching elements and lower arm switching elements of the inverter, are turned on before the outdoor fan motor is driven, with the result that levels of the phase currents flowing in the outdoor fan motor are higher than a second level, which is higher than a first level, the controller controls the outdoor fan motor such that driving of the outdoor fan motor is temporarily stopped while the compressor motor to drive the compressor is continuously operated.

16. The air conditioner according to claim 15, wherein when the outdoor fan motor is rotated by the external wind, in a state in which all of the lower arm switching elements, among the upper arm switching elements and the lower arm switching elements of the inverter, are turned on before the outdoor fan motor is driven, with the result that the levels of the phase currents flowing in the outdoor fan motor are between the first level and the second level, the controller controls the outdoor fan motor such that a rotational speed of the outdoor fan motor is increased while the outdoor fan motor is rotated in a first direction and then rotated in a second direction opposite to the first direction during a speed increase period of the outdoor fan motor after an alignment period during which a rotor of the outdoor fan motor is aligned when the outdoor fan motor is driven.

17. The air conditioner according to claim 15, further including:
    gate drivers to supply gate driving signals to the upper arm switching elements and the lower arm switching elements of the inverter; and
    gate capacitors connected between opposite terminals of the gate drivers, wherein the controller controls all of the lower arm switching elements, among the upper arm switching elements and the lower arm switching elements of the inverter, to be turned on before the outdoor fan motor is driven such that the gate capacitors connected between the opposite terminals of the gate drivers corresponding to the upper arm switching elements are charged with gate driving voltages.

18. The air conditioner according to claim 17, wherein the controller controls the gate capacitors connected between the opposite terminals of the gate drivers corresponding to the lower arm switching elements to be charged with the gate driving voltages before the outdoor fan motor is driven.

19. The air conditioner according to claim 15, further including:
    a display, wherein when the outdoor fan motor is rotated by external wind, in a state in which all of the lower arm switching elements, among the upper arm switching elements and the lower arm switching elements of the inverter, are turned on before the outdoor fan motor is driven, with the result that the levels of the phase currents flowing in the outdoor fan motor are higher than the second level, the controller controls a message indicating that an operation of the air conditioner has been stopped or a message indicating that an operation of the outdoor fan has been stopped to be displayed on the display.

20. The air conditioner according to claim 19, wherein when the outdoor fan motor is rotated by external wind, in a state in which all of the lower arm switching elements, among the upper arm switching elements and the lower arm switching elements of the inverter, are turned on before the outdoor fan motor is driven, with the result that the levels of the phase currents flowing in the outdoor fan motor are between the first level and the second level, the controller controls an external wind operation mode message to be displayed on the display.

* * * * *